(12) United States Patent
Zyambo et al.

(10) Patent No.: US 8,244,177 B2
(45) Date of Patent: Aug. 14, 2012

(54) WIRELESS INTERFACE

(75) Inventors: Emmanuel Zyambo, Oxford (GB); Lloyd Lukama, Oxford (GB); Christopher James Brown, Oxford (GB); Michael James Brownlow, Oxford (GB); Kazuhiko Miyata, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 374 days.

(21) Appl. No.: 12/449,510

(22) PCT Filed: Jan. 30, 2008

(86) PCT No.: PCT/JP2008/051901
§ 371 (c)(1),
(2), (4) Date: Aug. 11, 2009

(87) PCT Pub. No.: WO2008/099722
PCT Pub. Date: Aug. 21, 2008

(65) Prior Publication Data
US 2010/0068998 A1    Mar. 18, 2010

(30) Foreign Application Priority Data
Feb. 14, 2007 (GB) .................. 0702842.6

(51) Int. Cl.
*H04B 5/00* (2006.01)
*H01Q 1/36* (2006.01)
(52) U.S. Cl. ................... 455/41.1; 343/895
(58) Field of Classification Search .......... 455/41.1, 455/522, 572, 127.1; 343/866, 867, 895; 355/522, 572, 127.1, 41.1
See application file for complete search history.

(56) References Cited

U.S. PATENT DOCUMENTS

| | | | |
|---|---|---|---|
| 6,088,741 A | 7/2000 | Murata | |
| 6,533,178 B1 | 3/2003 | Gaul et al. | |
| 6,575,374 B1 | 6/2003 | Boyadjian et al. | |
| 7,071,629 B2 | 7/2006 | Russ et al. | |
| 7,183,987 B2 * | 2/2007 | Akiho et al. | 343/742 |
| 7,764,928 B2 * | 7/2010 | Dokai et al. | 455/41.2 |
| 2002/0152606 A1 | 10/2002 | Huang | |
| 2006/0083955 A1 | 4/2006 | Kanouda et al. | |
| 2007/0158804 A1 | 7/2007 | Hosoya et al. | |
| 2007/0195834 A1 | 8/2007 | Tanaka et al. | |

(Continued)

FOREIGN PATENT DOCUMENTS

CA    2 543 655    7/2006

(Continued)

OTHER PUBLICATIONS

English translation of International Search Report issued for International Patent Application No. PCT/JP2008/060037.
E. Zyambo et al. "A Fully Monolithic Wireless Display System." Proceedings of the 14th International Display Workshops, 2007.
E. Zyambo et al. "A Fully Monolithic Wireless Display System." The 15th International Workshop on Active-Matrix Flatpanel Displays and Devices, (AM-FPD 08), 2008.

(Continued)

*Primary Examiner* — Nay A Maung
*Assistant Examiner* — Cindy Trandai
(74) *Attorney, Agent, or Firm* — Harness, Dickey & Pierce, P.L.C.

(57) ABSTRACT

In one embodiment of the present invention, a wireless interface is provided for supplying all signals and power exclusively wirelessly from a transmitting section to a receiving section. The transmitting section includes a transmitter arranged to modulate a carrier with signals, such as data, control and timing signals. The transmitter is connected to a transmit antenna which comprises a parallel resonant circuit in series with a series resonant circuit. The parallel and series resonant circuits include inductors which are inductively coupled to an inductor of a receive antenna in the receiving section.

28 Claims, 23 Drawing Sheets

U.S. PATENT DOCUMENTS

| | | | |
|---|---|---|---|
| 2007/0197049 | A1 | 8/2007 | Tanaka et al. |
| 2008/0067874 | A1* | 3/2008 | Tseng .......................... 307/104 |
| 2008/0153416 | A1* | 6/2008 | Washiro ........................ 455/41.1 |
| 2008/0227478 | A1* | 9/2008 | Greene et al. ................. 455/522 |
| 2010/0237707 | A1* | 9/2010 | Karalis et al. ................. 307/104 |
| 2010/0253152 | A1* | 10/2010 | Karalis et al. ................. 307/104 |
| 2011/0043328 | A1* | 2/2011 | Bassali ........................ 340/5.71 |
| 2011/0074347 | A1* | 3/2011 | Karalis et al. ................. 320/108 |

FOREIGN PATENT DOCUMENTS

| | | |
|---|---|---|
| EP | 1 538 558 A2 | 6/2005 |
| EP | 1547719 A2 | 6/2005 |
| GB | 2 331 638 A | 5/1999 |
| GB | 2 431 821 A | 5/2007 |
| JP | 64-073918 | 3/1989 |
| JP | 07-046515 | 2/1995 |
| JP | 9-298485 | 11/1997 |
| JP | 9-298500 | 11/1997 |
| JP | 11-332135 A | 11/1999 |
| JP | 11-353438 A | 12/1999 |
| JP | 2000-059261 A | 2/2000 |
| JP | 2000-113144 | 4/2000 |
| JP | 2002-032728 A | 1/2002 |
| JP | 2004-102840 A | 4/2004 |
| RU | 2213370 | 9/2003 |
| WO | WO 2008/099722 | 8/2008 |

OTHER PUBLICATIONS

E. Zyambo et al. "A Fully Monolithic Wireless Display System." ECS Trans., 16, 3 (2008) DOI:10.1149/1.2980525.

International Search Report.

Search Report dated Jun. 21, 2007 for the UK patent application No. GB0702842.6.

Behzad Razavi, "Design of Analog CMOS Integrated Circuits", McGraw-Hill 2001.

R. Jacob Baker et al., "CMOS, Circuit design, Layout and Simulation" IEEE Press 1998.

M. Ghovanloo et al., "A widespread Frequency-Shift Keying Wireless Link for Inductively Powered Biomedical Implants" IEEE Trans. on Circuits and Systems, vol. 51, No. 12, Dec. 2004, pp. 2374-2383.

E. Zambyo et al., "A Fully Monolithic Wireless Display System" Late Technical news submission to the International Display Workshop (IDW07) 2007.

E. Zambyo et al., "A Fully Monolithic Wireless Display System" The Fifteenth International Workshop on Active-Matrix Flat Pane Displays and Devices, Jul. 2-4, 2008.

E. Zambyo et al., "A Fully Monolithic Wireless Display System" ECS Transactions vol. 16, Issue 9, p. 309-312, Oct. 12, 2008.

* cited by examiner

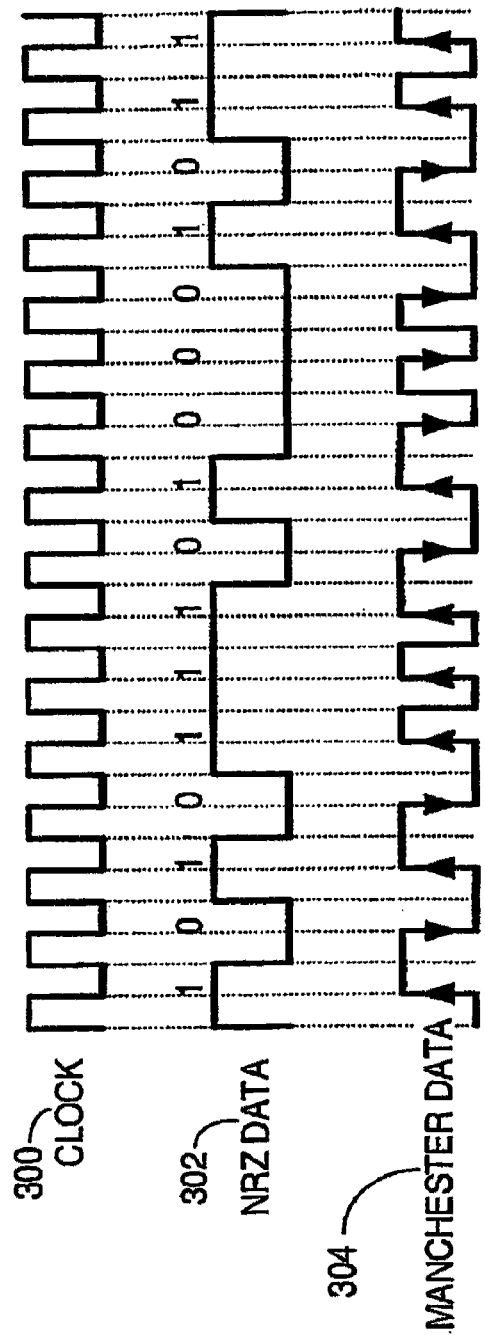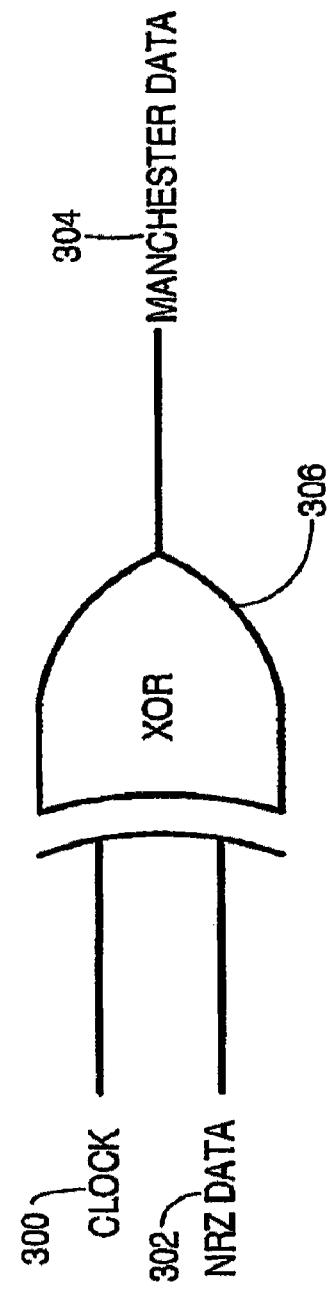
FIG. 5a BACKGROUND ART
FIG. 5b BACKGROUND ART

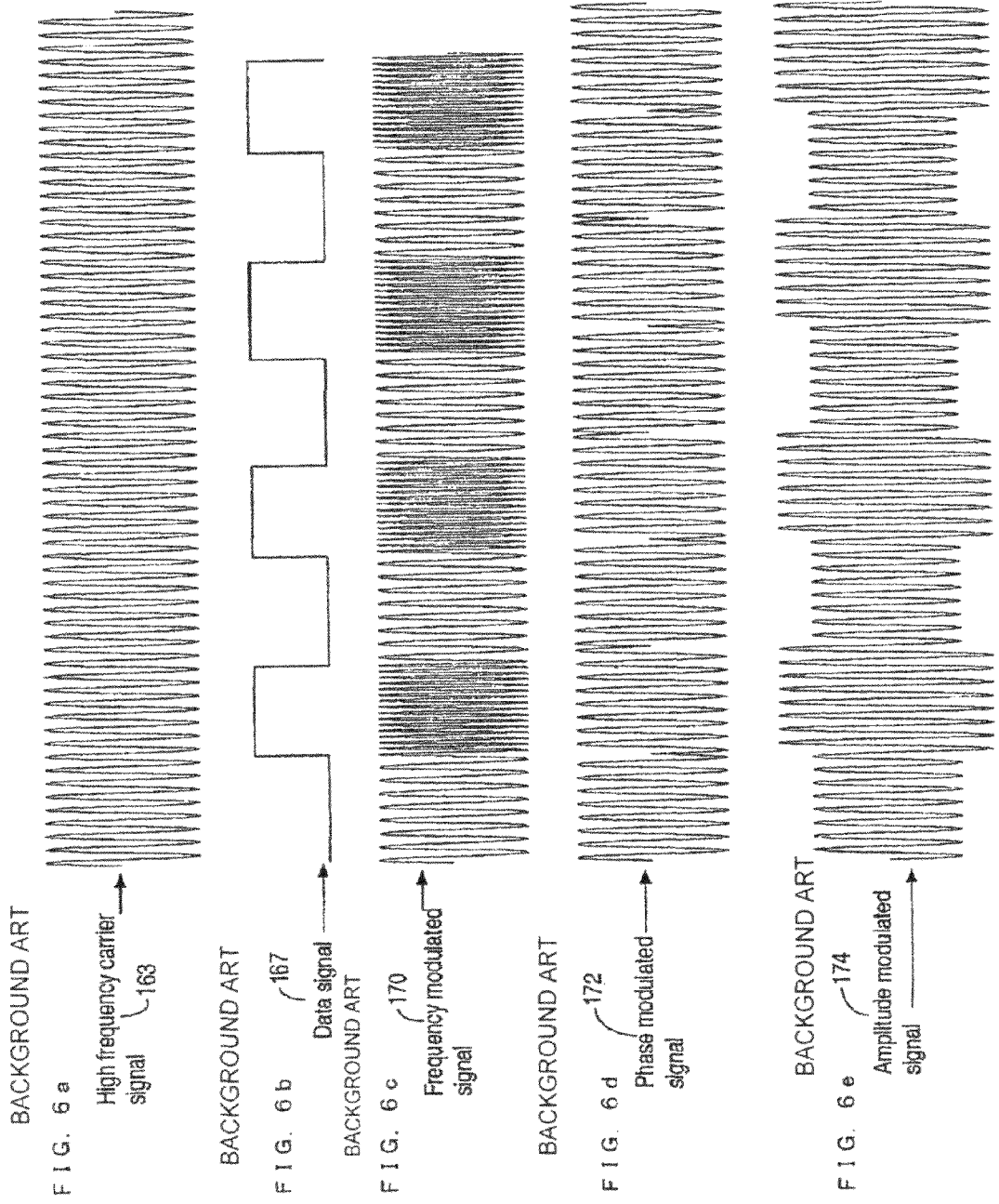

Series Resonance circuit

Parallel Resonance circuit

WIRELESS INTERFACE

TECHNICAL FIELD

The present invention relates to a wireless interface. For example, such an interface may be used for supplying data and power wirelessly within a display system, for example including a flat panel display of liquid crystal or organic light emitting diode type. Another example of an application of such an interface is in a radio frequency identification system. The present invention also relates to a transmitting section and to a receiving section for such an interface.

BACKGROUND ART

FIG. 1 of the accompanying drawings shows a generic liquid crystal display system which is an example of a flat panel display. Such a display is made up of an active area including an active matrix 14 which displays the image, a backlight system including a driver 12 to illuminate the display and a number of driver integrated circuits (ICs) 10 to control the addressing of pixels. The system is supplied with the display data 2, a number of control and timing signals 6 and power 4. These signals are typically supplied via a flexible printed cable (FPC). Attaching this cable adds a significant cost in the manufacture of the display. Display systems may also have integrated audio 250 and sensor 270 systems in addition to the active display area as illustrated in FIG. 2 of the accompanying drawings. Each one of these systems requires wireline connections to provide the system data (audio data 252, sensor data 266 and display data 2) and the relevant timing and control data (audio timing and control 254, sensor timing and control 268, display timing and control 6). The display system may have a single external power source 256 which may then connect to a series of voltage regulators 271 to meet the different voltage requirements (4, 258, 262, and 277). The increase in the complexity of the display system inevitably leads to a corresponding increase in the number of external connections which results in a bigger FPC connector. However, products incorporating these display systems are becoming physically smaller in size and there is therefore pressure to find alternative methods of transmitting the signals to the display system.

A wireless interface is a very attractive proposition. FIG. 3 of the accompanying drawings shows a generic wireless system comprising a data source 20 to generate the data, a transmitter system 22 which carries out the required formatting and signal processing, and a transmit antenna 24. These items generally form the transmitter side. The transmit antenna launches the signal as an electromagnetic wave or optical signal (depending on the implementation) through the wireless channel 26. On the receiver side, the receive antenna 28 couples the signal to the receiver system 30 which processes the data and passes it on to the data sink 32.

FIG. 4 of the accompanying drawings illustrates a generic transmitter system. The first block is a data source 160 to provide the actual content to be transmitted. Assuming the data is digital, it comprises a stream of ones and zeros where a high voltage level represents a one and a low voltage represents a zero. This coding scheme is called non-return to zero (NRZ).

This data may then be further processed and formatted 162 to match it optimally to the wireless channel. There are a number of coding schemes that can be employed at this stage. One of the most popular schemes is Manchester Encoding which is illustrated by the timing waveforms in FIG. 5a of the accompanying drawings. Manchester code is a self-clocking code with a minimum of one and a maximum of two level transitions per bit. In the Manchester data 304, a 'Zero' is encoded as a High-to-Low transition and a 'One' is encoded as a Low-to-High transition. Between two identical bits of data there is an extra level transition. It is normally implemented using the exclusive OR gate (XOR) function 306 between the data clock signal 300 and the NRZ data signal 302 as illustrated in FIG. 5b of the accompanying drawings. The XOR function of two variables is 1 if either of them but not both are 1.

After the data has been correctly formatted and encoded (FIG. 4), the next stage in the process is called modulation. A modulator 165 uses a data signal 167 to alter one of the properties of the high frequency carrier signal 163 generated by an oscillator 161. FIGS. 6a to 6e of the accompanying drawings illustrate typical modulation signals. FIG. 6a illustrates the high frequency carrier signal 163 and FIG. 6b illustrates the data signal 167. The parameters that are normally altered are one of the following: frequency, resulting in frequency shift keying (FSK) 170 (FIG. 6c); amplitude, resulting in amplitude shift keying (ASK) 174 (FIG. 6e); phase, resulting in phase shift keying (PSK) 172 (FIG. 6d). All other modulation schemes are derived from these three basic schemes. There are several methods available to implement these schemes. FIGS. 7a to 7c of the accompanying drawings summarise possible implementations of simple ASK, PSK and FSK. An amplitude modulated signal 174 is obtained by mixing a carrier signal 163 and a data signal 167 (FIG. 7b). A frequency modulated signal is obtained by switching between two carrier signals (f1 163 and f2 171) depending on the data signal 167 (FIG. 7a). In phase shift keying 172, the phase of the carrier signal 163 is varied between two values depending on the data signal 167 (FIG. 7c).

The modulated signal occupies a certain amount of frequency spectrum. This is a function of the modulation type being employed. The frequency components present in the modulated signal can be identified by computing the Fourier transform of the signal. This plot of the power available in the frequency components is known as the power spectral density (PSD) of the signal. It then leads to the definition of the signal bandwidth (BW). Although there are many acceptable definitions of bandwidth, it is generally referred to as the amount of spectrum occupied by all spectral components which have a power level of at least half the maximum level. The bandwidth of the modulated signal is directly related to the speed of the data signal. A high data rate requires more bandwidth.

The next stage in the transmitter (FIG. 4) involves amplifying the modulated signal to make it strong enough to be launched across the wireless channel. This is achieved using a power amplifier 164 which takes the low power modulated signal and produces a high power signal. Several methods for achieving this exist and examples are disclosed in Behzad Razavi, "Design of Analog CMOS Integrated Circuits", McGraw-Hill 2001.

After the signal has been amplified, it is then launched into the wireless channel using an antenna 166. An antenna transforms the signal from a coupled electromagnetic wave into a radiated one and is designed to optimise power transfer in the frequency range of interest. The radiation will often be required to have a specified directionality i.e. maximise radiation of the signal in a specific direction.

Care must be taken in the design of the power amplifier 164 and the transmit antenna 166 to ensure that they have sufficient bandwidth to handle the modulated signal. If the bandwidth available in these systems is less than the signal bandwidth, then the signal will lose some information and can lead to erroneous decoding of the transmitted data.

The radiated signal travels across the wireless channel 26 (FIG. 3) after which it couples to the receive antenna 28. The receive antenna is designed to capture as large a signal as possible from the transmitted signal. Like the transmit antenna, it is designed to be efficient over the specified frequency range and direction.

The signal from the receive antenna then passes to the receiver system 30 whose main function is to extract the original data signal from the received signal. The exact implementation of the receiver system depends on the modulation scheme that was employed at the transmitter. FIG. 8*d* of the accompanying drawings shows a wireless receiver system using an amplitude shift keying modulated signal as an example. A generic wireless receiver system comprises a receive antenna 28, a demodulator 311 which extracts the transmitted data signal and a pulse shaping system 314 to convert the analogue data signal into a digital signal. The output 315 of the receiver system is the same as the data signal 167 that was used to modulate the carrier in the transmitter system (FIG. 4). In an amplitude modulated signal 174 (FIG. 8*a*), the data signal is embedded in the envelope (outline) 313 of the modulated carrier. Therefore the main role of the receiver, in this case, is to extract the envelope of the modulated carrier. This is carried out by first of all rectifying the amplitude modulated carrier which results in the output 310 (FIG. 8*b*) only having the positive going part of the original amplitude modulated signal. The rectified signal is then passed through a low pass filter 312 to remove the high frequency carrier signal. The last stage then involves pulse shaping 314 the low pass filtered signal into clean digital signal 315 (FIG. 8*c*) with defined high and low voltage levels.

There are many ways of implementing the pulse shaper. An example is illustrated in FIG. 9 of the accompanying drawings. A self-biased comparator circuit may be used to generate a digital output signal 402 from an analogue input signal 400. The high and low output voltage levels 404 and 406 are set during the design of the circuit. An arrangement of this type is disclosed in R. Jacob Baker, Harry W. Li, David E. Boyce, "CMOS, Circuit design, Layout and Simulation" IEEE Press, 1998.

The output signal 315 (FIG. 8*c*) at this point represents the data signal that was used to modulate the carrier at the transmitter side.

All systems employing wireless communication to transfer data are based on the description provided above. The systems will generally differ in the frequency of operation, data rate and modulation schemes employed. Wireless systems also increasingly have extra features such as error correction and perhaps encryption to maintain the integrity of the transmitted signal.

In certain applications, it may be desirable to transmit power wirelessly as this can reduce the number of wireline connections required by a system. This is normally achieved by transmitting power in the magnetic field of one coil and coupling it into a second coil. A generic scheme for transmitting power is illustrated in FIG. 10 of the accompanying drawings. Power transmission is achieved by coupling the magnetic field 34 of coil A 36 to that of coil B 38. Coil A is supplied with a power signal 35 in the form of an alternating current. The output signal 37 in coil B will also have an alternating current. The next step is to rectify this signal as illustrated in FIG. 11 of the accompanying drawings. A full wave rectifier 354 can be used to obtain an output signal 352 of single polarity (0 to $+V_p$) from a dual polarity ($-V_p$ to $+V_p$) input power signal 350. At this point the signal is not a proper direct current power signal as it contains ripples. These can be removed by using some form of smoothing circuitry. This could be a large capacitor connected across the output signal. Once the relatively ripple free power signal has been obtained, it can then be regulated and stepped down to the required voltage levels.

To improve the efficiency of the power transfer using magnetic coupling, resonance circuits can used. The efficient transfer of power wirelessly can be achieved using series resonance at the transmitter and parallel resonance at the receiver. The series resonance at the transmitter maximises the current in the circuit, which in turn maximises the coupling magnetic field. The parallel resonance at the receiver maximises the voltage. Two types of such circuits are shown in FIGS. 12*a* and 12*b* of the accompanying drawings. The resonance of a series circuit (FIG. 12*a*) with resistor 40 of resistance R, inductor 42 of inductance L, and capacitor 44 of capacitance C, occurs when the inductive and capacitive reactances are equal in magnitude but cancel each other because they are 180 degrees apart in phase. Series resonance results in maximum current flowing through the circuit whose value depends on the resistance R. The sharpness of the resonance depends on the value of R and characterizes the "Q" of the circuit. The quality factor, "Q", is a property of the inductor and is given by:

$$Q = \frac{\omega L}{r_s}$$

where $\omega$ is the angular frequency ($2\pi f$) and $r_s$ is the equivalent series resistance of the metal windings of the inductor. The quality factor is a measure of the inductor's ability to store energy in its magnetic field such that a high Q results in a large current or voltage at resonance and efficient power transfer. FIG. 13 of the accompanying drawings shows examples of a response with high Q 390 and low Q 392.

Parallel resonance in a circuit with capacitor 46 of capacitance C, inductor 48 of inductance L, and resistor 50 of resistance R occurs at the frequency when the reactance due to the inductor is equal and opposite to the reactance due to the capacitor. Parallel resonance results in a maximum voltage across the resistor. The value R of the resistor 50 dictates the value of this voltage. Power transfer at resonance is more efficient as the voltages or currents at resonance are maximized as illustrated in FIG. 14 of the accompanying drawings, which plots the variation of the coupling magnetic field 65 with frequency 64. At the resonance frequency 60, the coupling magnetic field 65 is maximum and therefore the power transfer will be maximum at this frequency.

Wireless transmission of data alone is well known. The same can be said of wireless power transfer alone. However, the difficulty arises when an application requires both power and data to be transmitted wirelessly across the same wireless channel. Transferring data requires the data signal to somehow "piggyback" or be carried on the power signal. An example of such a technique is using the carrier signal to transfer the power and then using Amplitude Shift Keying modulation to couple the data to this carrier as illustrated in FIG. 15 of the accompanying drawings. The amplitude of the power carrying signal 74 is modified by the data carrying signal 76. This results in a composite transmitted signal 78 which carries both the power and data. The receiver for this scenario is different from the generic receiver illustrated in FIG. 8 as it now has to extract both the power and data from the transmitted signal. FIG. 16 of the accompanying drawings shows an example of such a receiver system. The transmitted signal is coupled to the receiver system 222 via a receive antenna 130. This is then followed by two rectifiers (power rectifier 134 and data rectifier 140) to extract the power and data signals. The output of the power rectifier is an unregulated voltage which is regulated by voltage regulators 136 to provide the required voltage level, $V_R$ 138. In the data signal extraction path, the output 141 of the data rectifier 140 is connected to a demodulator 144 which produces an analogue version of the data signal. This is then passed through a pulse shaping stage 145 to produce a digital signal 146 which is the same as the transmitted data signal.

Mathematically, ASK is a multiplication process of the carrier signal with the data signal in the time domain. Sometimes it may be necessary for the depth of the envelope (also called modulation depth) to be variable. In this case, a dc component is added to the data signal before the multiplication process is carried out. If the power carrying signal 74 is represented by equation, $$x_c = \cos(2\pi f_c t),$$

the data carrying signal 76 by equation $$x_{data} = \cos(2\pi f_{data} t),$$

then the resulting transmitted signal 78 is represented, mathematically, by $$x_{trans} = (A + x_{data}) x_c = A \cos(2\pi f_c t) + \cos[2\pi t(f_c - f_{data})] + \cos[2\pi t(f_c + f_{data})]$$

where the depth of modulation is represented by a dc component A, $f_c$ is the frequency of the power carrying signal and $f_{data}$ is the frequency of the data carrying signal.

This implies that, in addition to the carrier (power carrying) signal component $f_c$, the transmitted signal will have frequency components at $(f_c - f_{data})$ and $(f_c + f_{data})$. FIG. 17 of the accompanying drawings shows the components of the transmitted signal in the frequency domain. The frequency components (fc−fdata 68) and (fc+fdata 62) are termed the sidebands of the transmitted signal. If the data carrying signal 76 has bandwidth, BW, the total bandwidth required to transmit both the sidebands is 2×BW 72.

For successful recovery of the power and data at the receiver side, the carrier and the two sidebands should be linearly transmitted across the wireless channel. In other words, the received signal should be directly proportional to the transmitted signal. The system transfer function (shape of the transmitter resonance curve) should, therefore, be such that it passes the signal without any distortion. FIG. 18 of the accompanying drawings shows the power carrying signal 60, the two sidebands 68, 62 and the system transfer function curve 67. For successful recovery at the receiver, the two sidebands should lie within the envelope of the transfer function curve 67. If the sidebands lie outside the resonance curve 67, such as at 61 and 63, data recovery will be impossible. The implication is that it is more difficult to recover both power and data if the data signal has high bandwidth. The equation relating this bandwidth limitation to the quality factor (Q) of the resonance curve is given by:

$$Q = fc/(2 \times BW)$$

Increasing Q improves the power transferring capability of the system but reduces the overall bandwidth of the data that can be transmitted. This makes the transmission of both power and high bandwidth data a very challenging problem.

A method of meeting this challenge was suggested in "A wideband Frequency-Shift Keying Wireless Link for Inductively Powered Biomedical Implants", M. Ghovanloo and K. Najafi, IEEE Trans. On Circuits and Systems, vol. 51, No. 12, December 2004. The approach taken by these authors is to shape the transfer function curve so that it passes the required frequency components in the transmitted signal without reducing the Q of the system. The authors use both series and parallel resonance circuits (FIG. 19 of the accompanying drawings) to produce two peaks in the transfer function to allow the power and the data carrying signal to be transmitted (FIG. 20 of the accompanying drawings). The system uses a form of Frequency Shift Keying (FSK) by transmitting data bit '0' at one frequency and data bit '1' at another frequency. A major drawback of this method is that the frequency at which the data bits '1' and '0' are transmitted should be highly stable. This is because the high Q of each peak in the transfer function of FIG. 20 results in a locally narrow band system and any deviation of the signal components from these frequencies will completely corrupt the transmitted signal. In FIG. 20, fdata 69 and fc 60 should therefore lie exactly at the centre of the respective peaks of the transfer function. This is very difficult if the Q is made very high to allow sufficient power transfer.

Another drawback of the system is that only one element of the antenna transmits the signal. In FIG. 19, this corresponds to Lp 120. The other inductor Ls, 116 does not transmit at all and just functions as a transfer function shaper. As the amount of power transfer the system can handle is related to the total inductance of the system, this will mean that the amount of power is limited to the amount that the single inductor Lp 120 can transmit. The actual implementation of this system is shown in FIG. 21 of the accompanying drawings where Ls 116 only has the function of shaping the signal and Lp 120 is the only transmitting element. This arrangement would suffice for low power systems. However, for high power system requirements such as powering the backlight of an LC display, a single transmitting element would not supply sufficient power.

Another known arrangement is disclosed in U.S. Pat. No. 7,071,629 B2 (FIG. 22 of the accompanying drawings). This system claims to be able to transmit both data 85 and power 84 wirelessly to a display system 81. This is implemented using a wireless transmitter element 90 and a receiver element 83 which incorporates a data and power extractor. However, the system is only able to transmit sufficient power to supply the driver ICs 87 and 89. The system still requires power to be supplied externally for the high voltage requirements of the display system in the form of HV 82 and GND 80 and cannot therefore be described as being totally wireless.

DISCLOSURE OF INVENTION

According to a first aspect of the invention, there is provided a wireless interface comprising a receiving section and a transmitting section arranged to supply signals and power exclusively wirelessly to the receiving section, the transmitting section comprising a transmitter arranged to modulate a carrier with the signals and connected to a transmit antenna comprising a parallel resonant circuit including a first inductor and a series resonant circuit including a second inductor, the receiving section comprising a receive antenna comprising at least one third inductor arranged to be inductively coupled to the first and second inductors.

It is thus possible to provide an arrangement which permits completely wireless interfacing of all signals and power between transmitting and receiving sections. For example, in the case of a display, it is possible to supply sufficient power for all power requirements of a display together with all signaling, such as data, timing and control signals. It is possible to supply sufficient power with sufficient bandwidth to accommodate high speed data transfer without requiring any wireline connection. All of the signal and power transmission can be supplied across a single wireless interface so that the receiving section, for example, including a display device, backlight and the like, may be self-contained and independent.

The interface may comprise a display. The receiving section may include an image display device. The device may be a liquid crystal device. The receiving section may include a display backlight.

The interface may comprise a radio frequency identification system.

The first and second inductors may be arranged to be substantially permanently inductively coupled to the at least one third inductor.

The first and second inductors may be arranged to be temporarily inductively coupled to the at least one third inductor.

The carrier may be a radio frequency carrier.

The parallel resonant circuit and the series resonant circuit may be connected in series.

The first and second inductors may be planar inductors. The first and second inductors may be coplanar. One of the first and second inductors may be disposed inside the other of the first and second inductors and coaxial therewith. The at least one third inductor may be arranged to be coaxial with the first and second inductors.

The at least one third inductor may be a planar inductor.

The parallel and series resonant circuits may be tuned to different frequencies. The parallel and series resonant circuits may be tuned substantially to respective sideband frequencies of the modulated carrier.

The parallel and series resonant circuits may have resonant frequencies and Q's such that the carrier and the sidebands of the modulated carrier are within the half power bandwidth of the transmit antenna.

The receive antenna may comprise a further resonant circuit including the at least one third inductor. The further resonant circuit may be a parallel resonant circuit. The further resonant circuit may be tuned to a frequency between the sidebands of the modulated carrier. The further resonant circuit may be tuned to the geometric mean of the sideband frequencies. The further resonant circuit may have a resonant frequency and a Q such that the carrier and the sidebands of the modulated carrier are within the half power bandwidth of the receive antenna.

The transmit and receive antennae may be arranged such that the carrier and sidebands of the modulated carrier are within the half power bandwidth of the inductive coupling.

The transmitter may be arranged to perform one of amplitude modulation, frequency modulation and phase modulation.

The receiving section may comprise a demodulator for demodulating signals received by the receive antenna.

The receiving section may comprise a power supply arrangement arranged to power the whole of the receiving section exclusively from power received by the receive antenna.

According to a second aspect of the invention, there is provided a transmitting section for a wireless interface for supplying signals and power exclusively wirelessly to a receiving section of the interface, comprising a transmitter arranged to modulate a carrier with the signals and connected to a transmit antenna comprising a parallel resonant circuit including a first inductor and a series resonant circuit including a second inductor.

According to a third aspect of the invention, there is provided a receiving section for a wireless interface for receiving signals and power exclusively wirelessly from a transmitting section of the interface, comprising a receive antenna comprising at least one third inductor arranged to be inductively coupled to first and second inductors of a transmit antenna of the transmitting section.

BRIEF DESCRIPTION OF DRAWINGS

Preferred embodiments of the present invention will now be described by way of illustrative examples with reference to the accompanying figures, in which:

FIG. 5a is a timing diagram illustrating Manchester encoding and FIG. 5b is a diagram illustrating the use of an XOR gate to provide such encoding;

FIGS. 6a to 6e comprise waveform diagrams illustrating examples of modulation schemes for use in wireless systems;

BEST MODE FOR CARRYING OUT THE INVENTION

Figure 23:
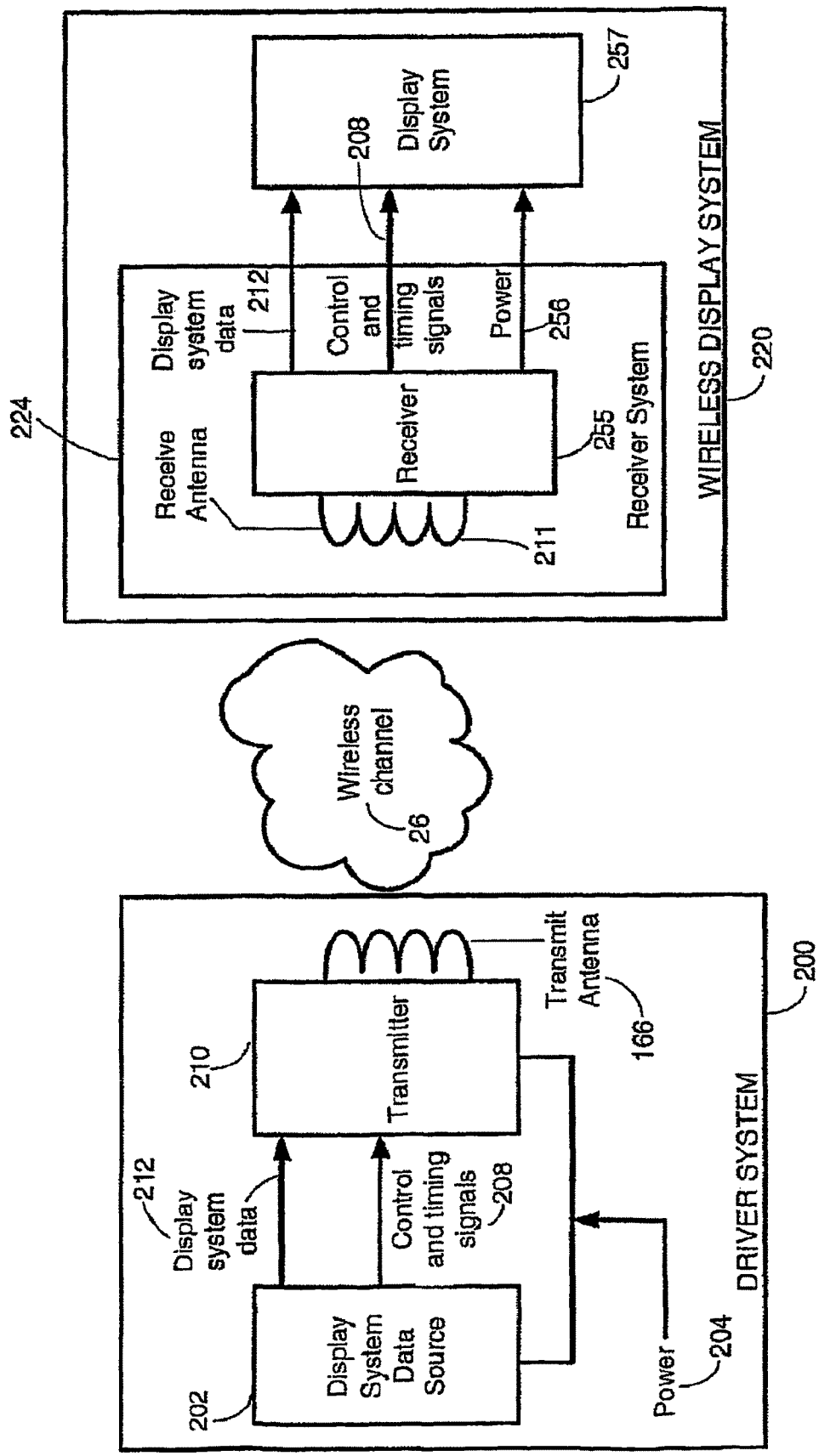
FIG. 23 is a block schematic diagram illustrating a wireless interface for a display constituting an embodiment of the invention.

FIG. 23 shows a complete wireless system comprising a driver system 200 constituting a transmitting section and a wireless display system 220 constituting a receiving section. The driver system 200 comprises a data source 202 to supply the display system data 212 and the control and timing signals 208. These signals are then connected to the transmitter system 210 which is then connected to a transmit antenna 166. The driver system 200 is supplied with power 204 externally to power all the circuitry. After the signal is launched from the transmit antenna 210, it traverses the wireless channel 26 to couple to the wireless display system 220. The wireless display system comprises the receive system 224 which is connected to the display system 257. A receive antenna 211 which captures the transmitted signal is connected to a receiver 255. The receiver extracts the display system data 212, control and timing signals 208 and power 256 from the transmitted signal. These signals are then connected to the display system 257. The wireless display system is a self-contained system and does not require any external connections. All the data signals 212, control and timing signals 208 and the power are supplied via the wireless interface completely eliminating the need for a physical connector to the display system for the transmitted signal.

Figure 1:
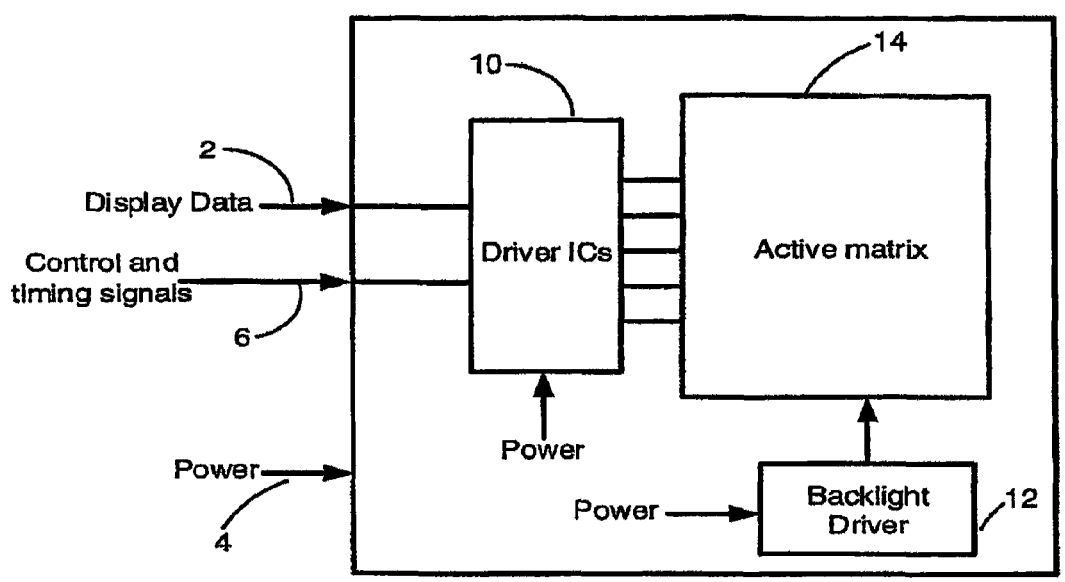
FIG. 1 is a block schematic diagram of a generic known type of liquid crystal display.
Figure 2:
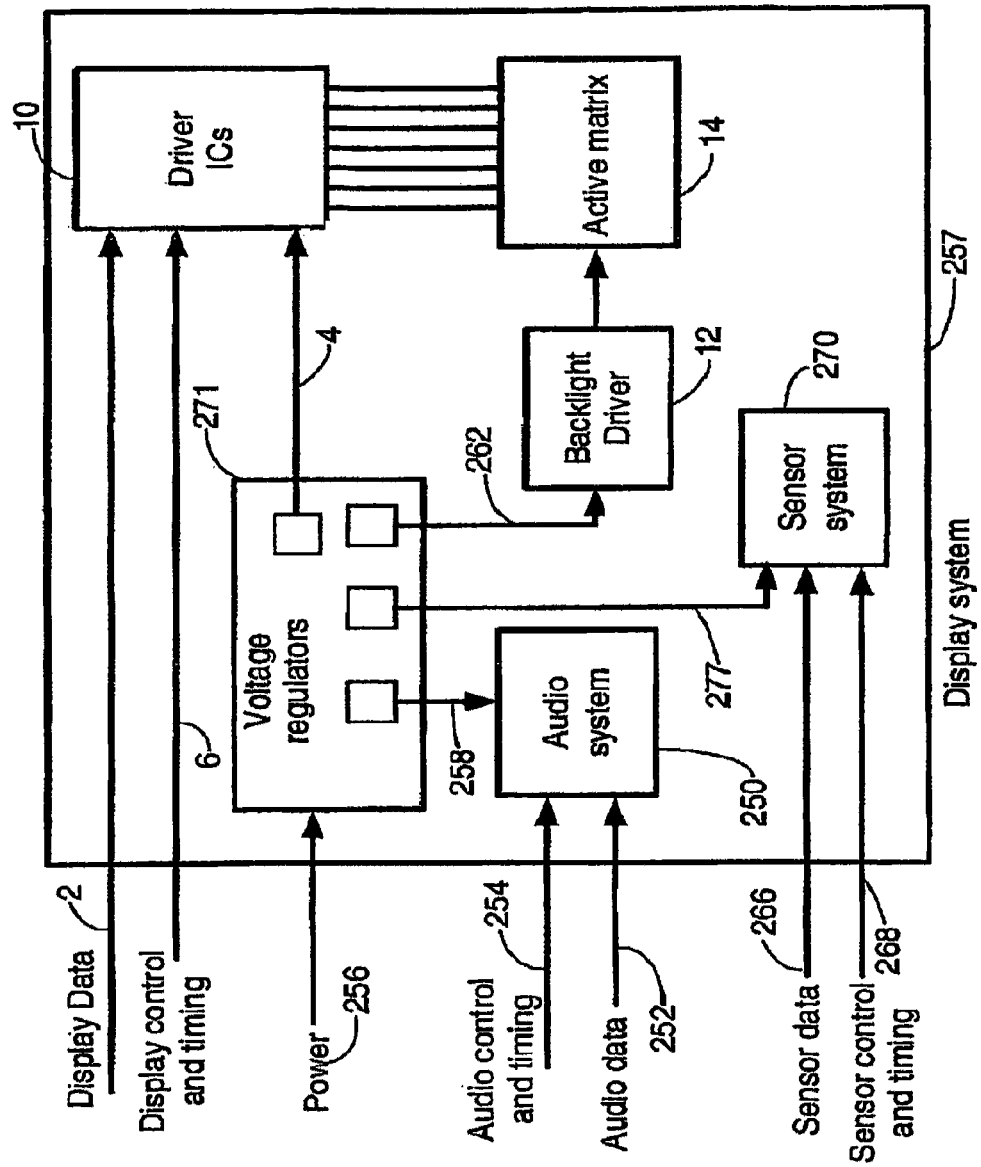
FIG. 2 is a block schematic diagram of a known type of integrated display system.
Figure 3:
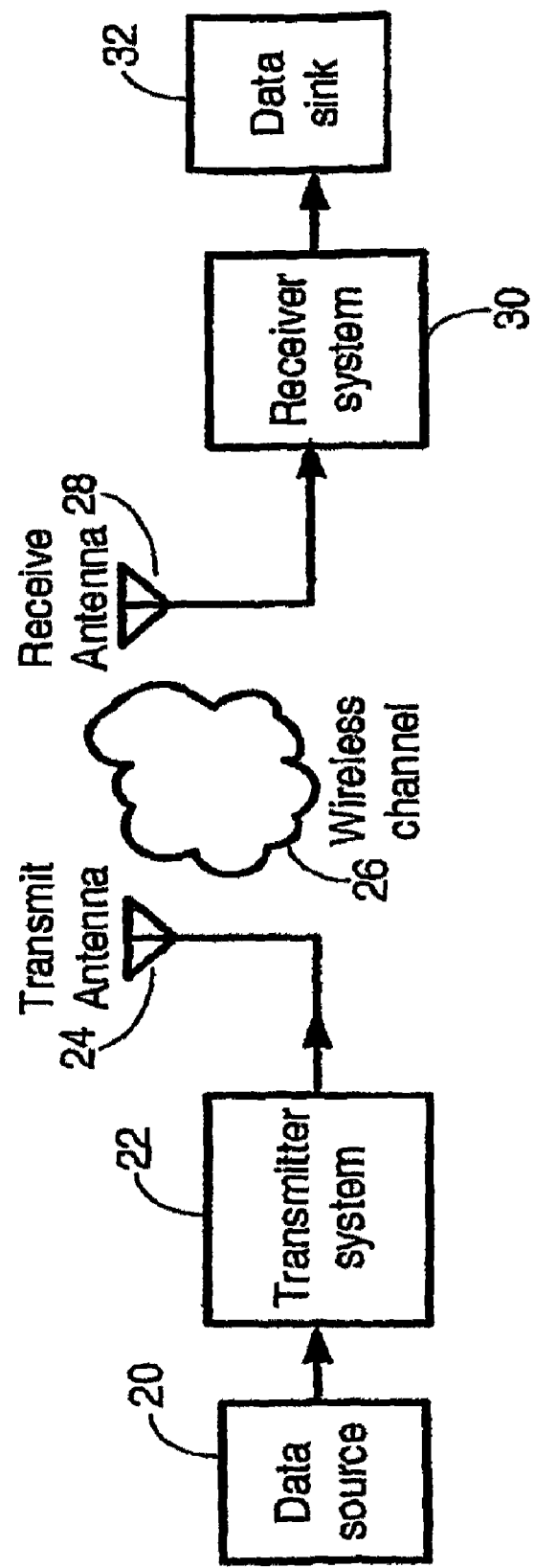
FIG. 3 is a block schematic diagram of a generic known type of wireless system.
Figure 4:
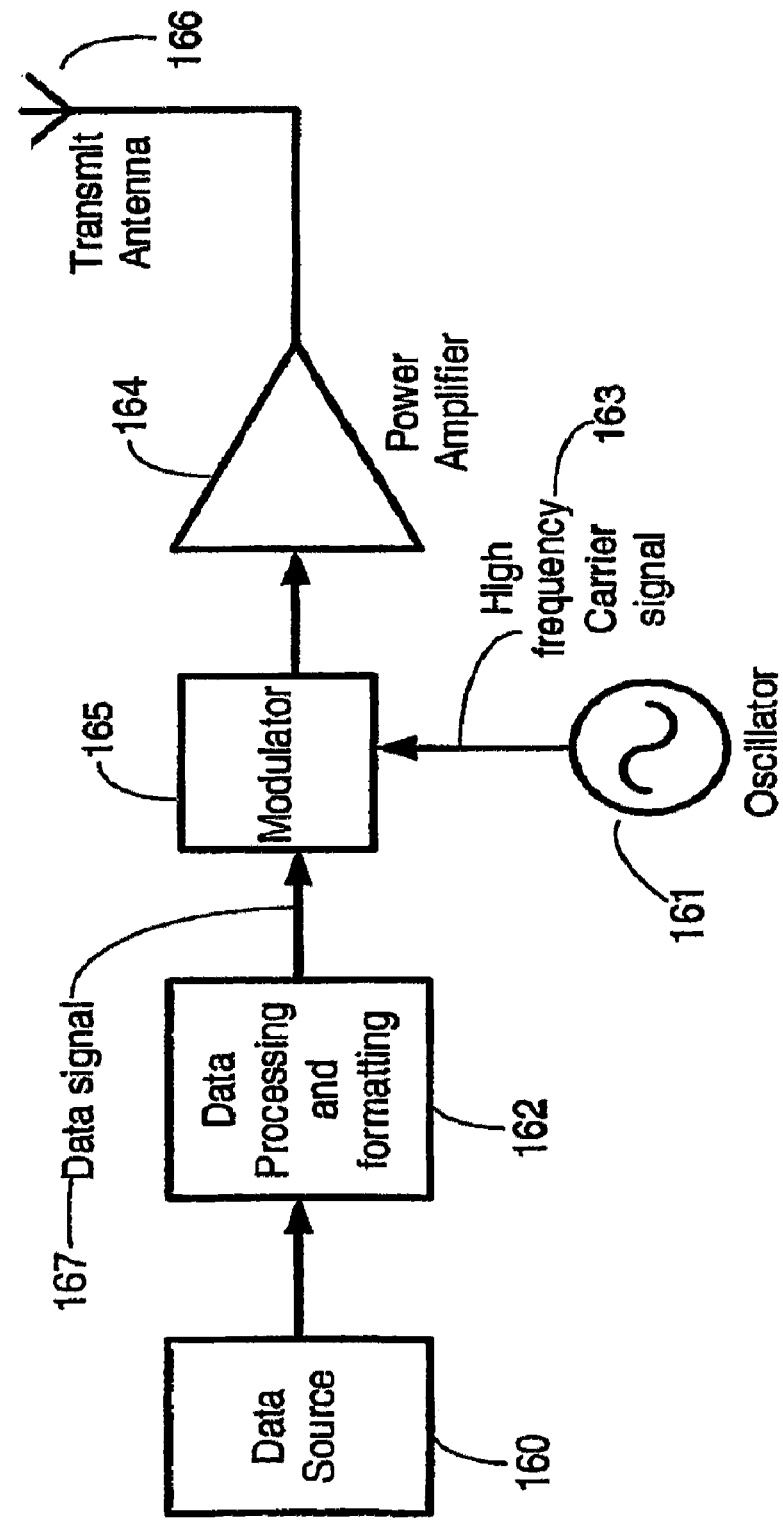
FIG. 4 is a block schematic diagram of a known type of wireless transmitter of a system of the type shown in FIG. 3.
Figure 7:
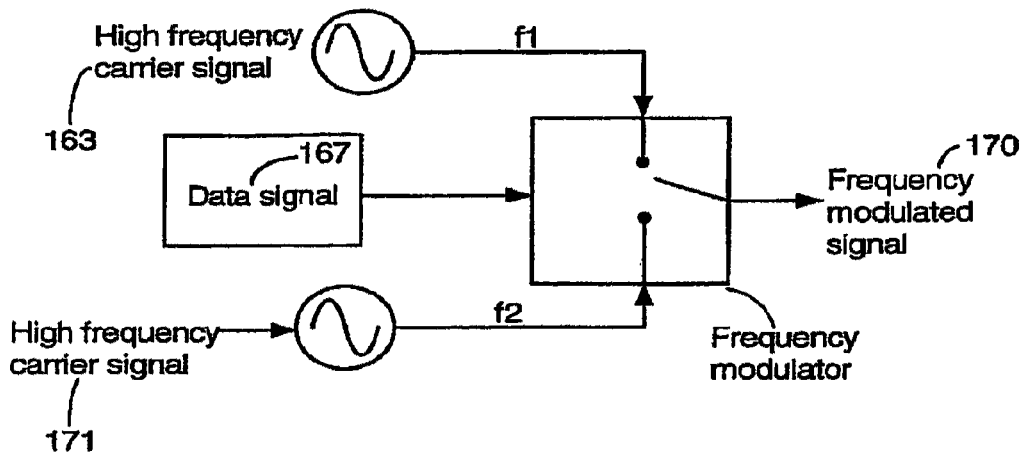
FIGS. 7a to 7c are block schematic diagrams illustrating modulators for implementing the modulation schemes illustrated in FIGS. 6c to 6e.
Figure 7:
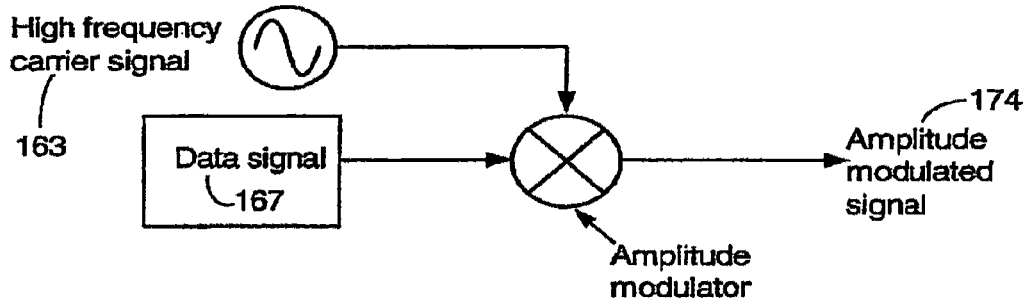
Figure 7:
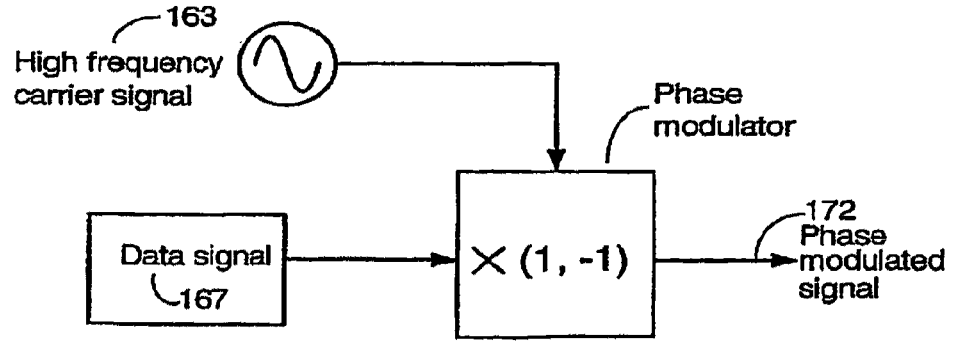
Figure 8A:
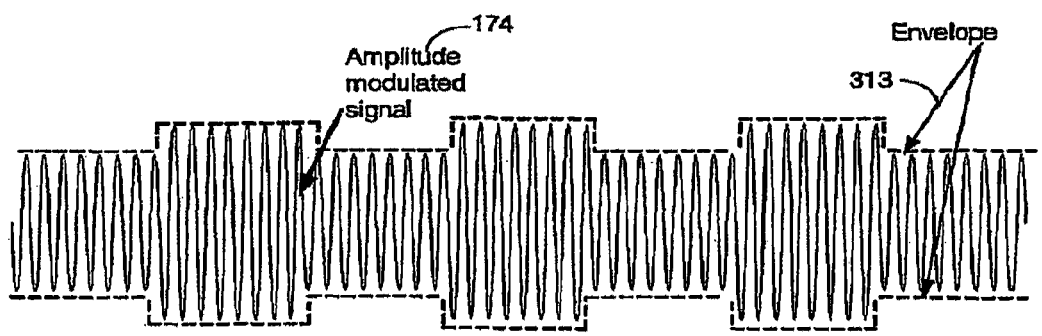
FIG. 8d is a block schematic diagram of a known type of receiver system and FIGS. 8a to 8c are diagrams illustrating waveforms occurring in the receiver system.
Figure 8B:
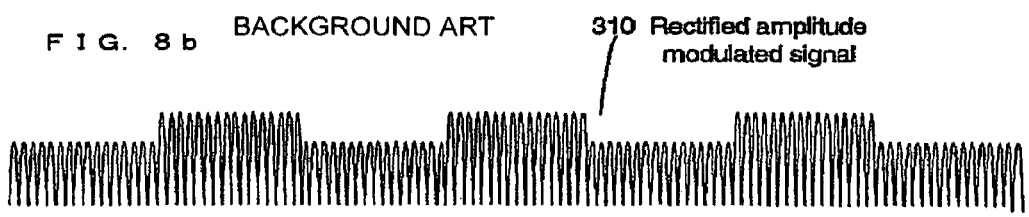
Figure 8C:
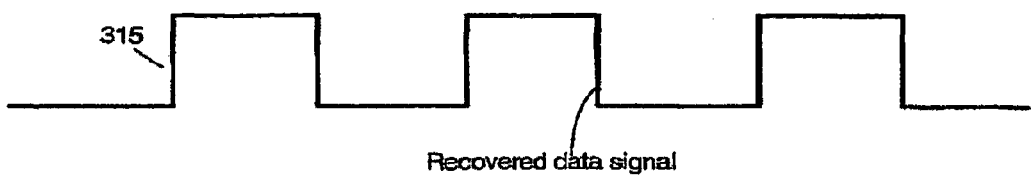
Figure 8D:
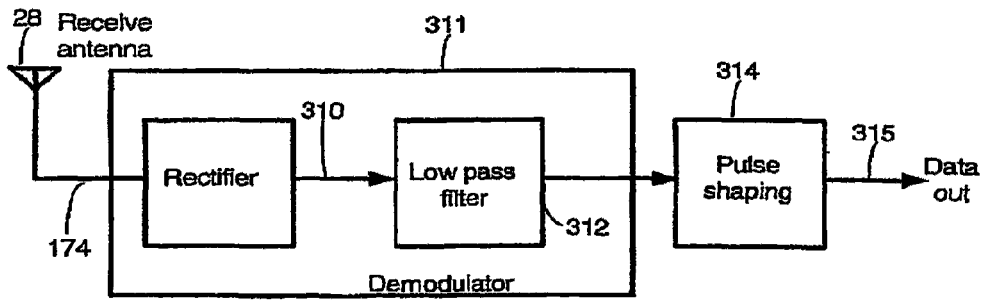
Figure 9:
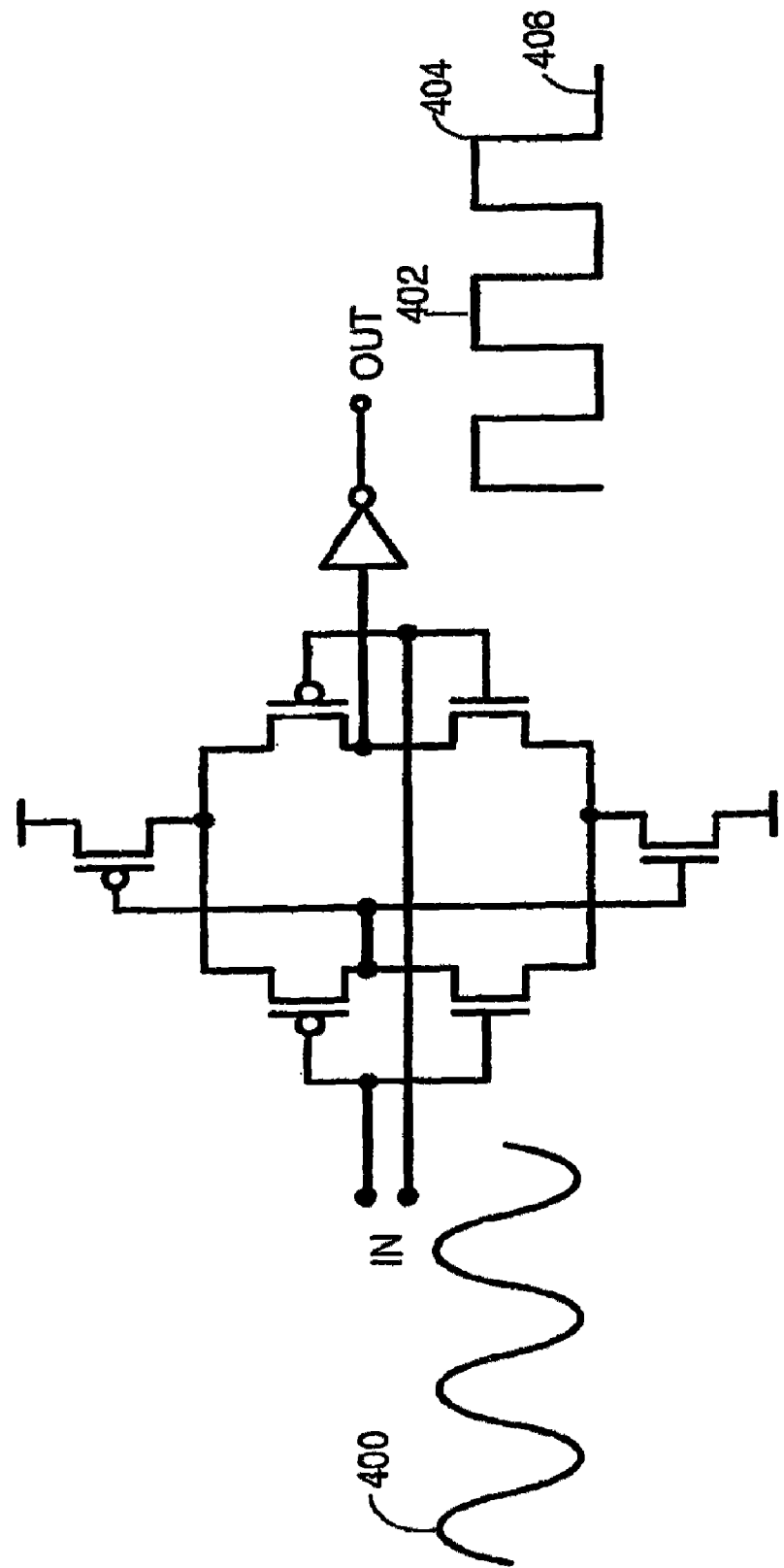
FIG. 9 is a circuit diagram illustrating a known type of pulse shaping circuit.
Figure 10:
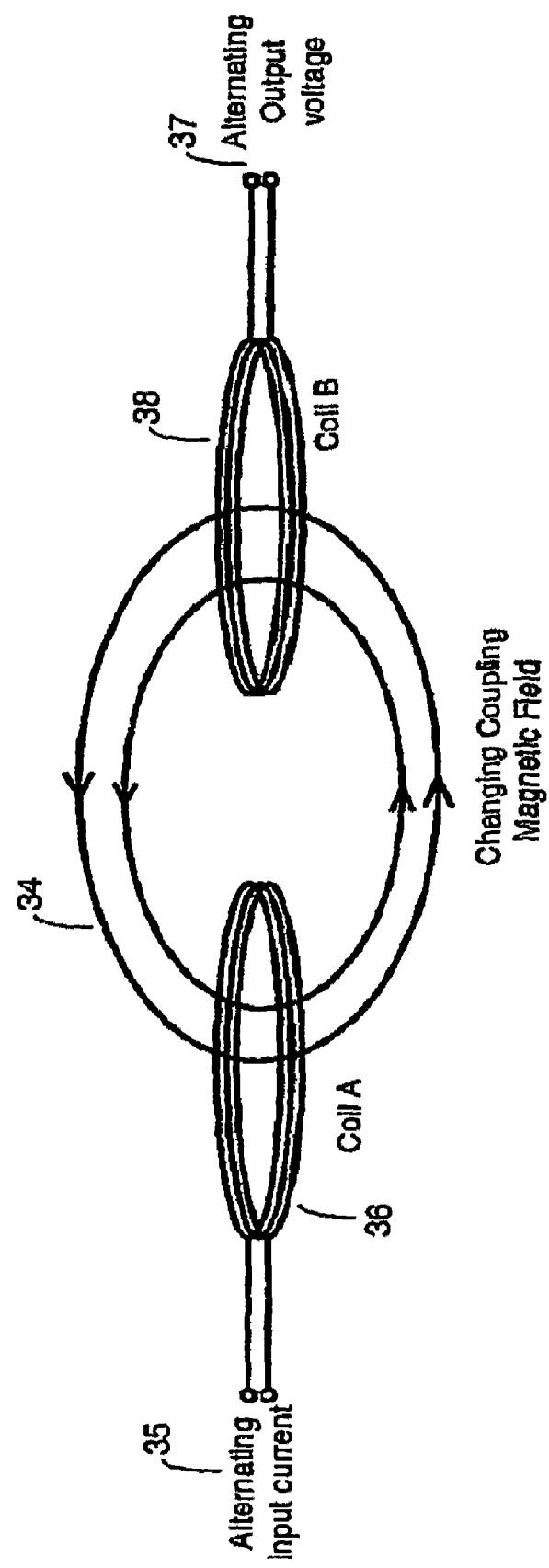
FIG. 10 illustrates a known type of power transfer arrangement using magnetic coupling.
Figure 11:
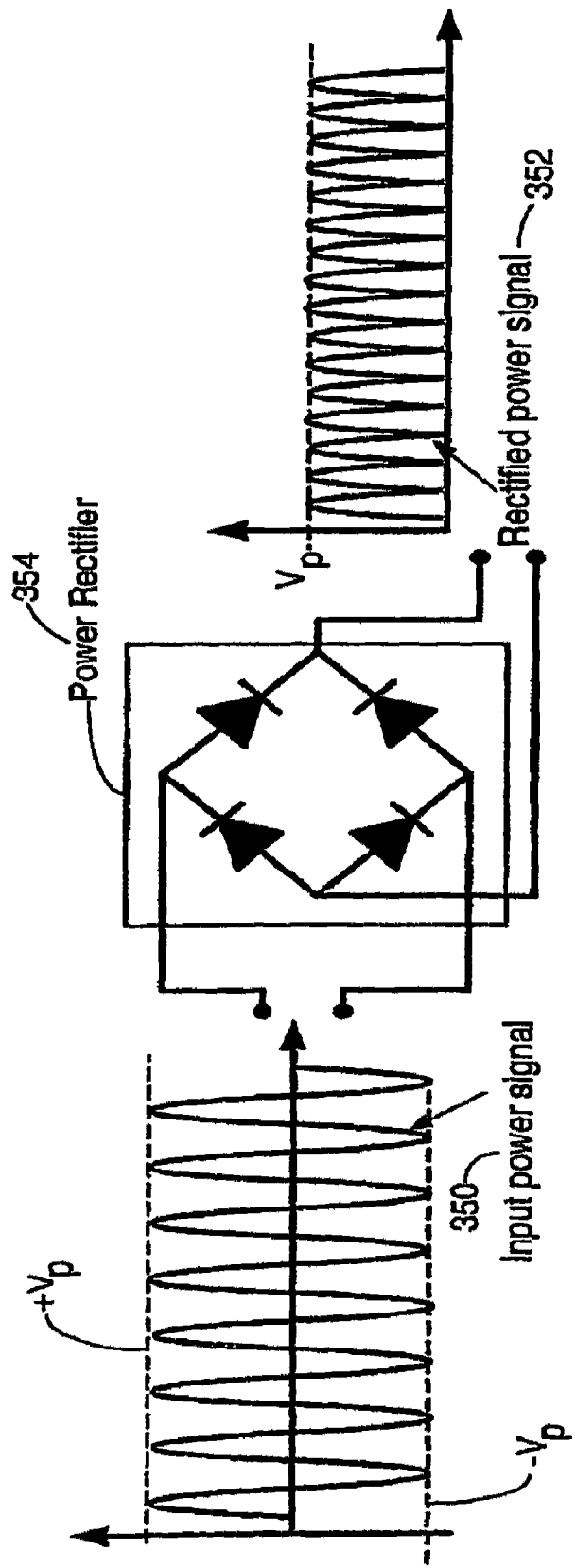
FIG. 11 is a circuit diagram illustrating a power rectifier for use with the arrangement shown in FIG. 10.
Figure 12A:
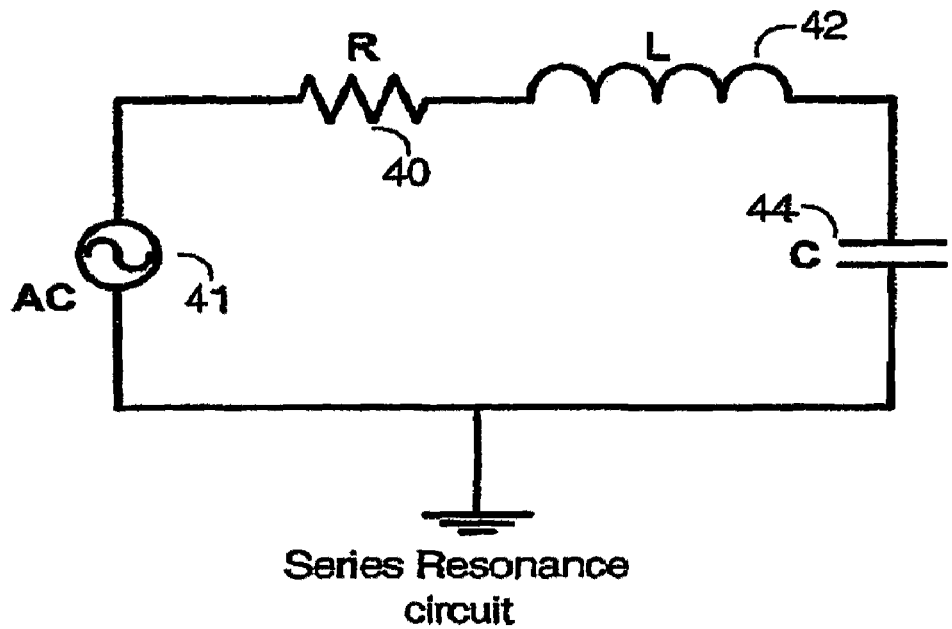
FIGS. 12a and 12b illustrate examples of known series and parallel resonant circuits.
Figure 12B:
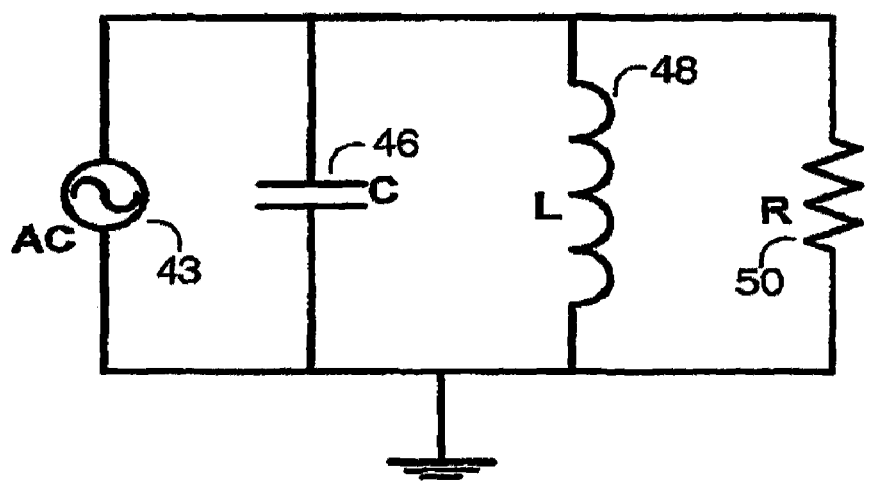
Figure 13:
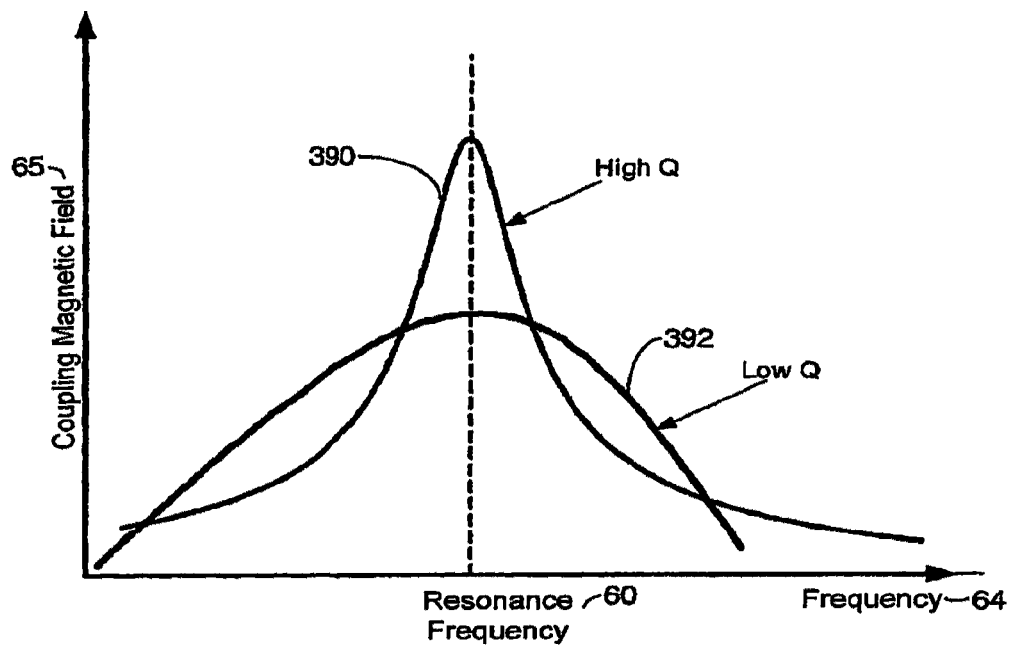
FIG. 13 is a graph of magnetic coupling field against frequency for parallel resonant circuits having different Q's.
Figure 14:
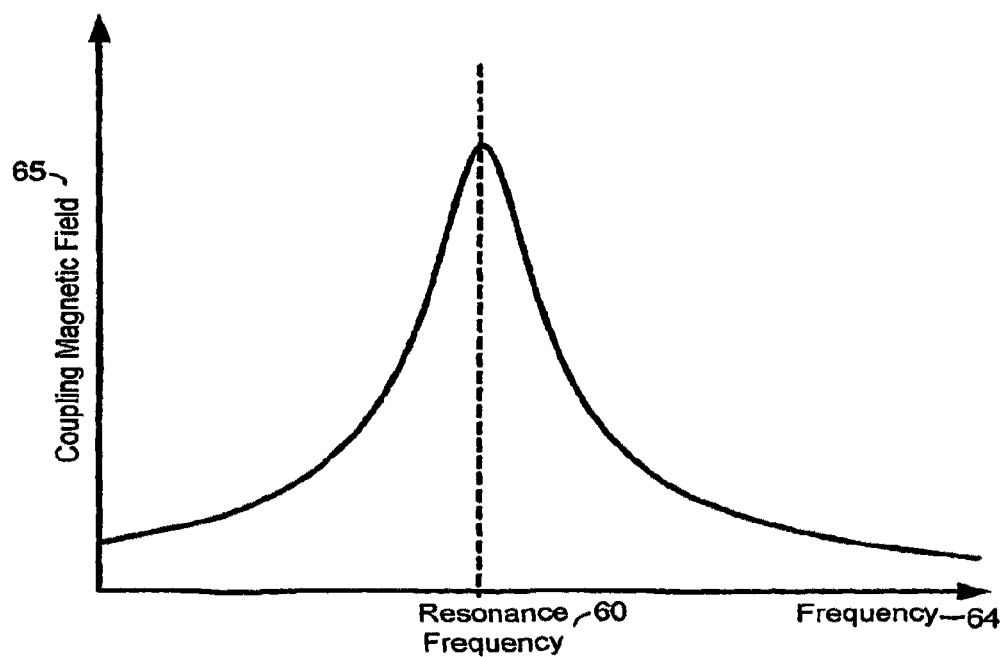
FIG. 14 is a graph of coupling magnetic field against frequency for a parallel resonant circuit of typical Q.
Figure 15:
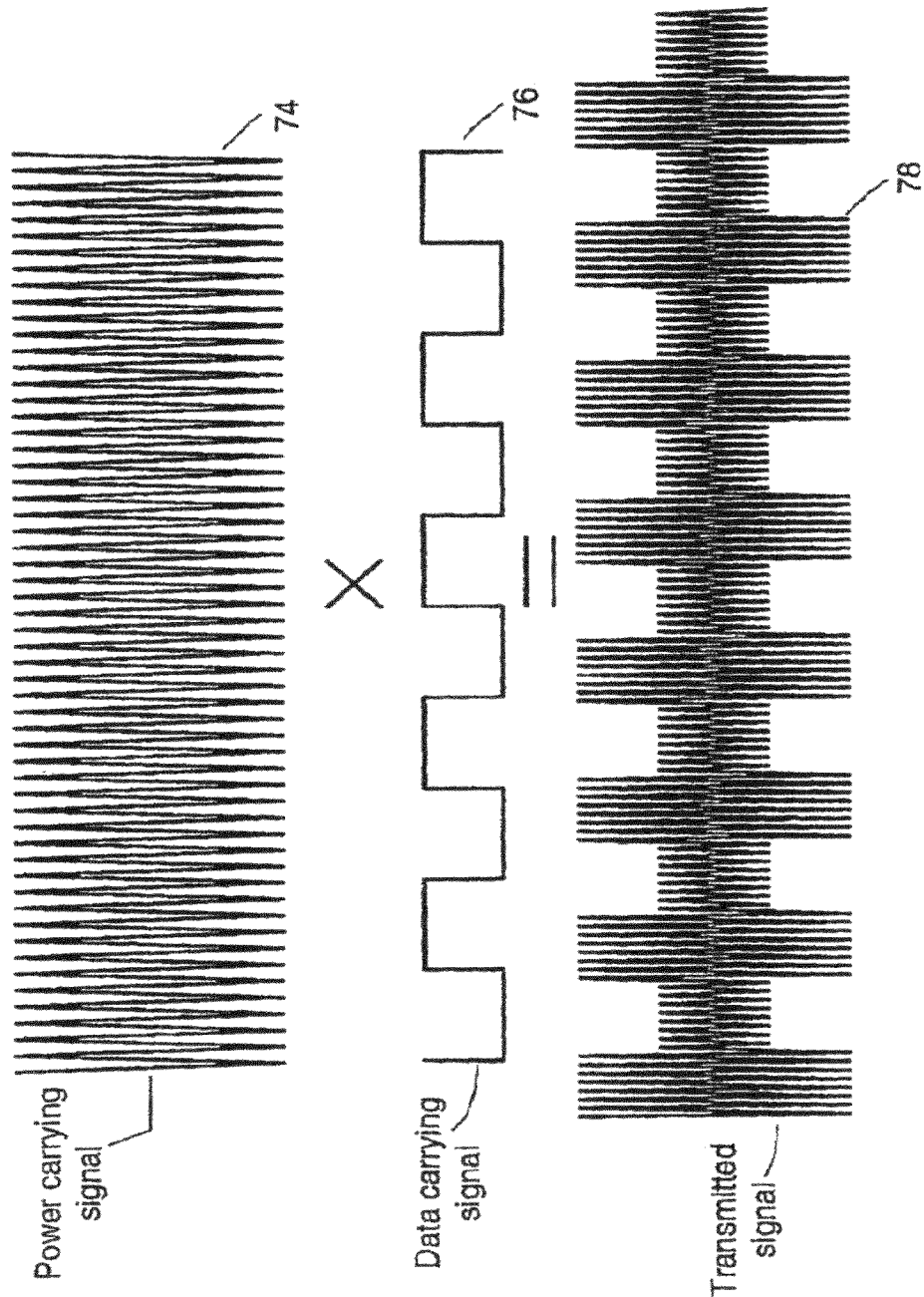
FIG. 15 comprise waveform diagrams illustrating data and power transfer using amplitude shift keying modulation.
Figure 16:
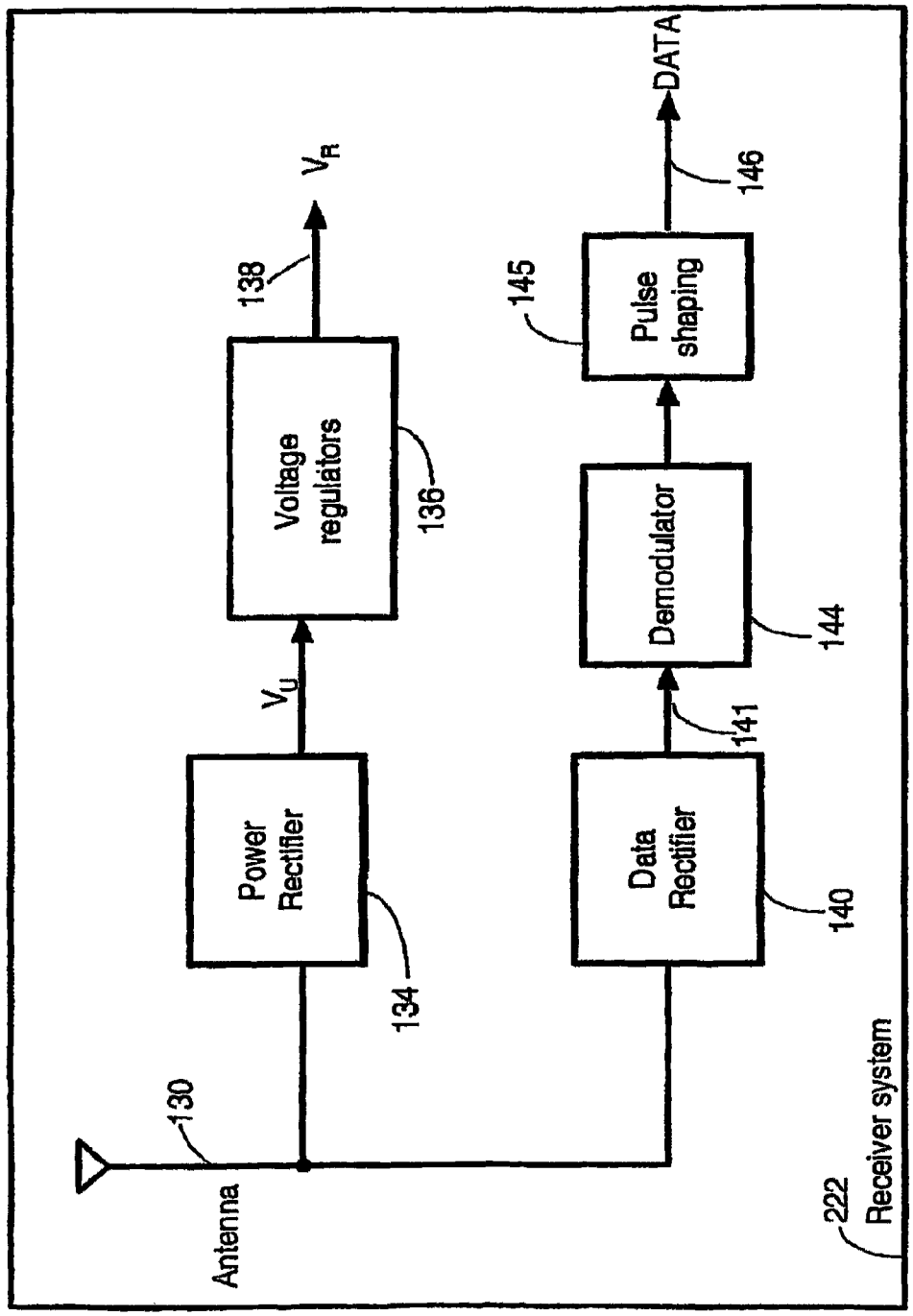
FIG. 16 illustrates a known type of receiver for extracting power and data.
Figure 17:
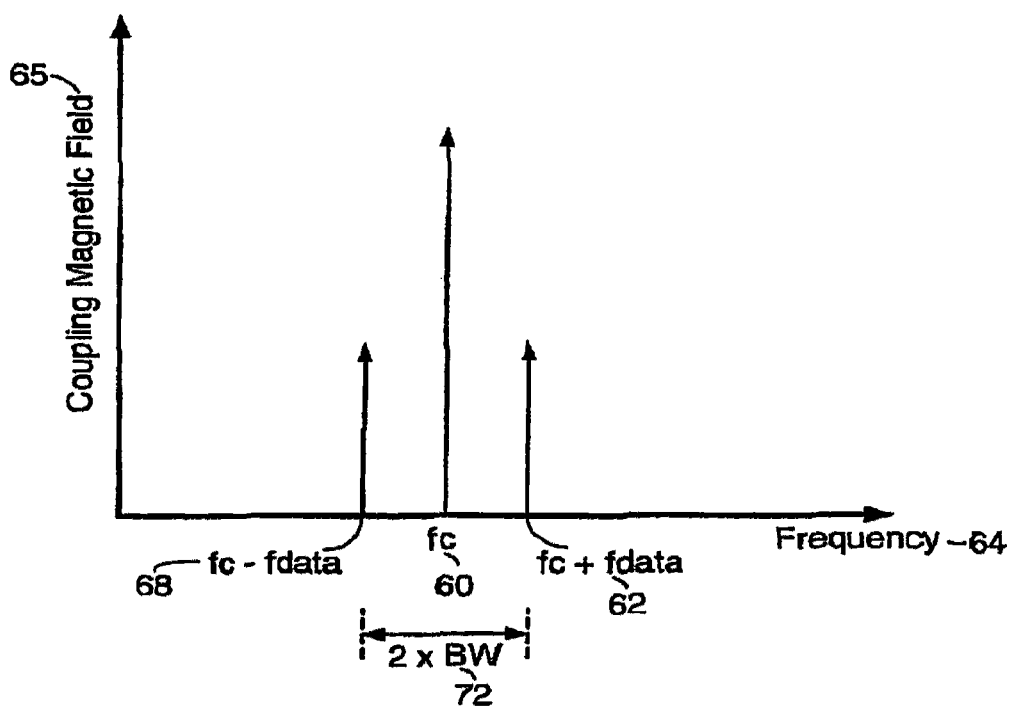
FIG. 17 is a graph illustrating the frequency spectrum of a typical amplitude modulated signal.
Figure 18:
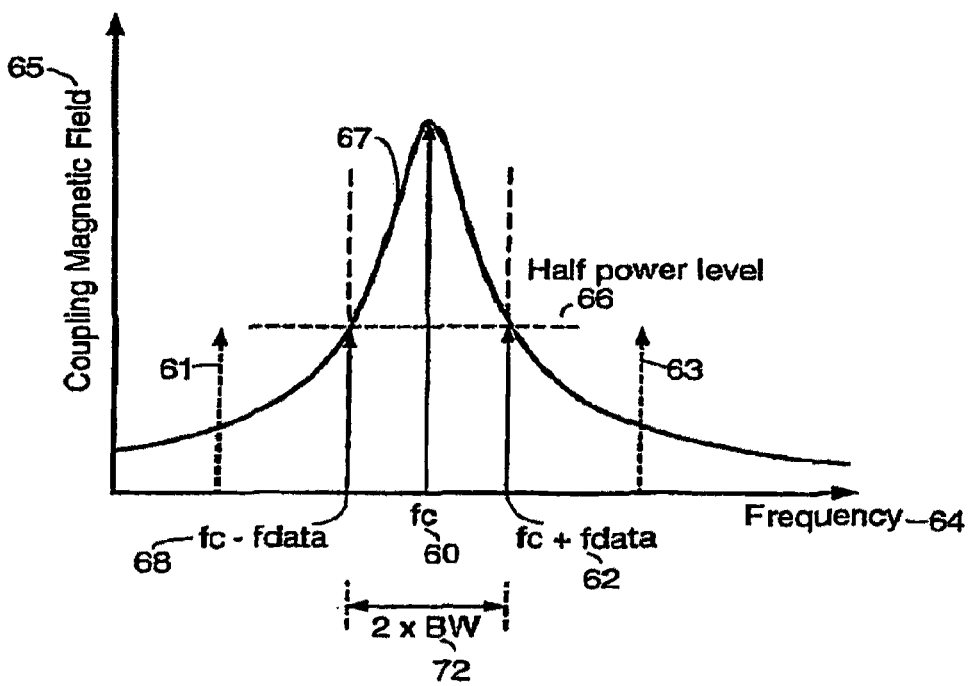
FIG. 18 is a graph of coupling magnetic field against frequency illustrating bandwidth requirements for transmitting both power and data.
Figure 19:
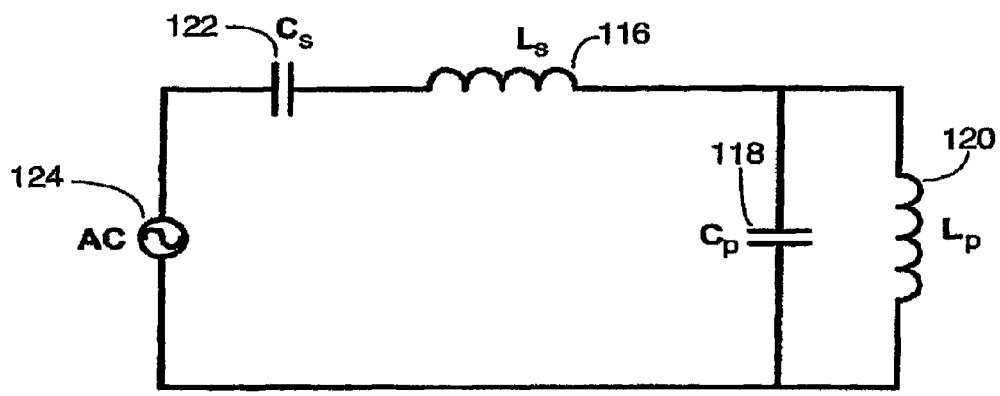
FIG. 19 is a circuit diagram illustrating a known type of circuit combining parallel and series resonant circuits.
Figure 20:
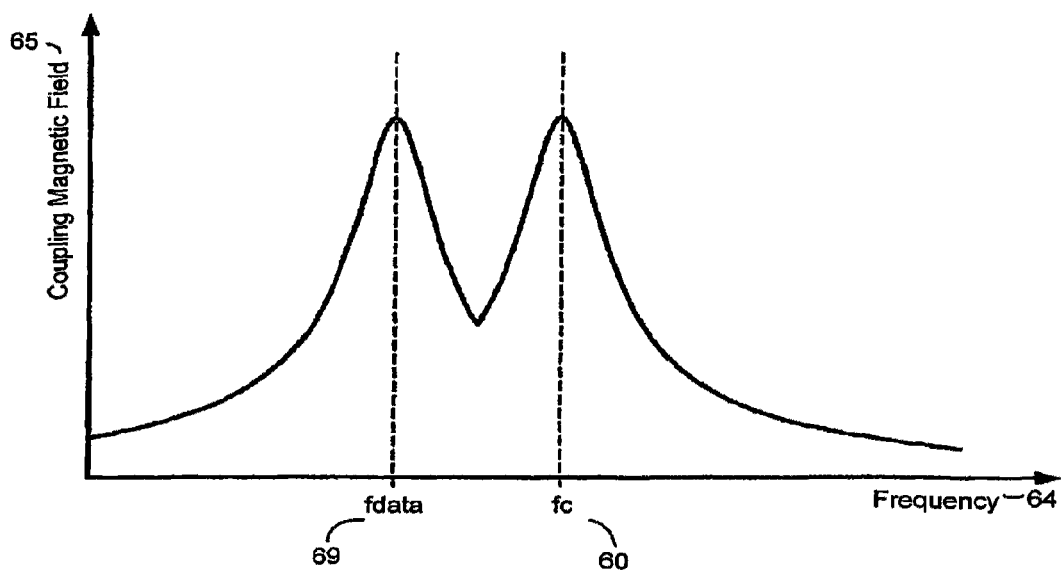
FIG. 20 is a graph of coupling magnetic field against frequency illustrating a transmitter resonant curve.
Figure 21:
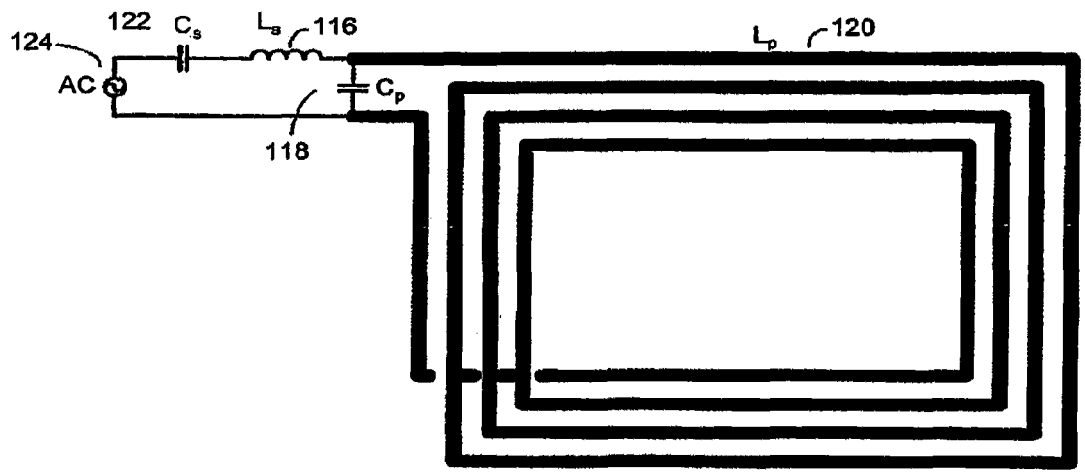
FIG. 21 illustrates diagrammatically a known type of transmit antenna using the circuit of FIG. 19.
Figure 22:
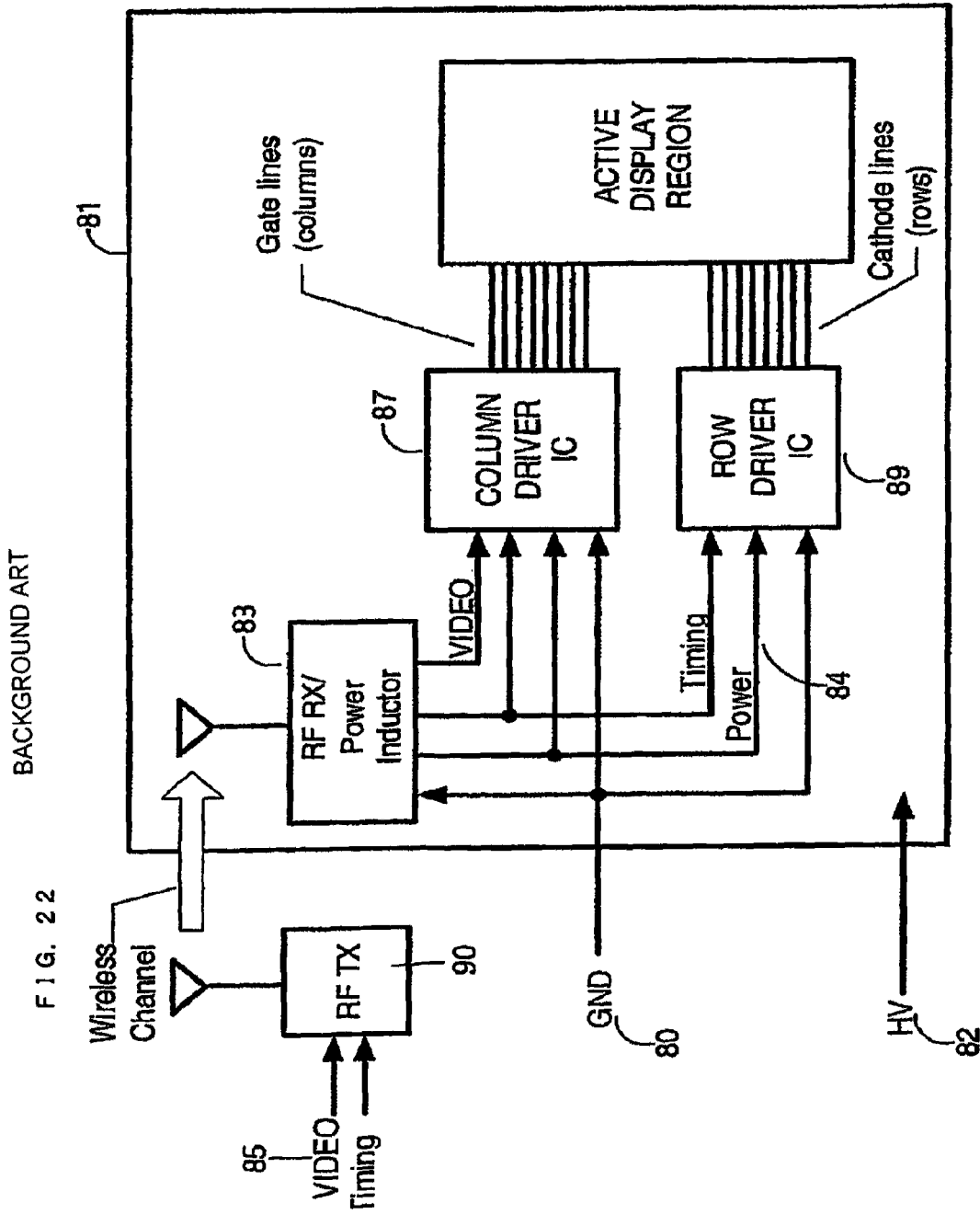
FIG. 22 is a block schematic diagram of a known type of partially wireless display system.

In FIG. 23, the display system data source 202, transmitter system 210, receiver 255 and display system 257 may, for example, be implemented as described hereinbefore and illustrated in FIGS. 2, 4, 16.

Figure 24:
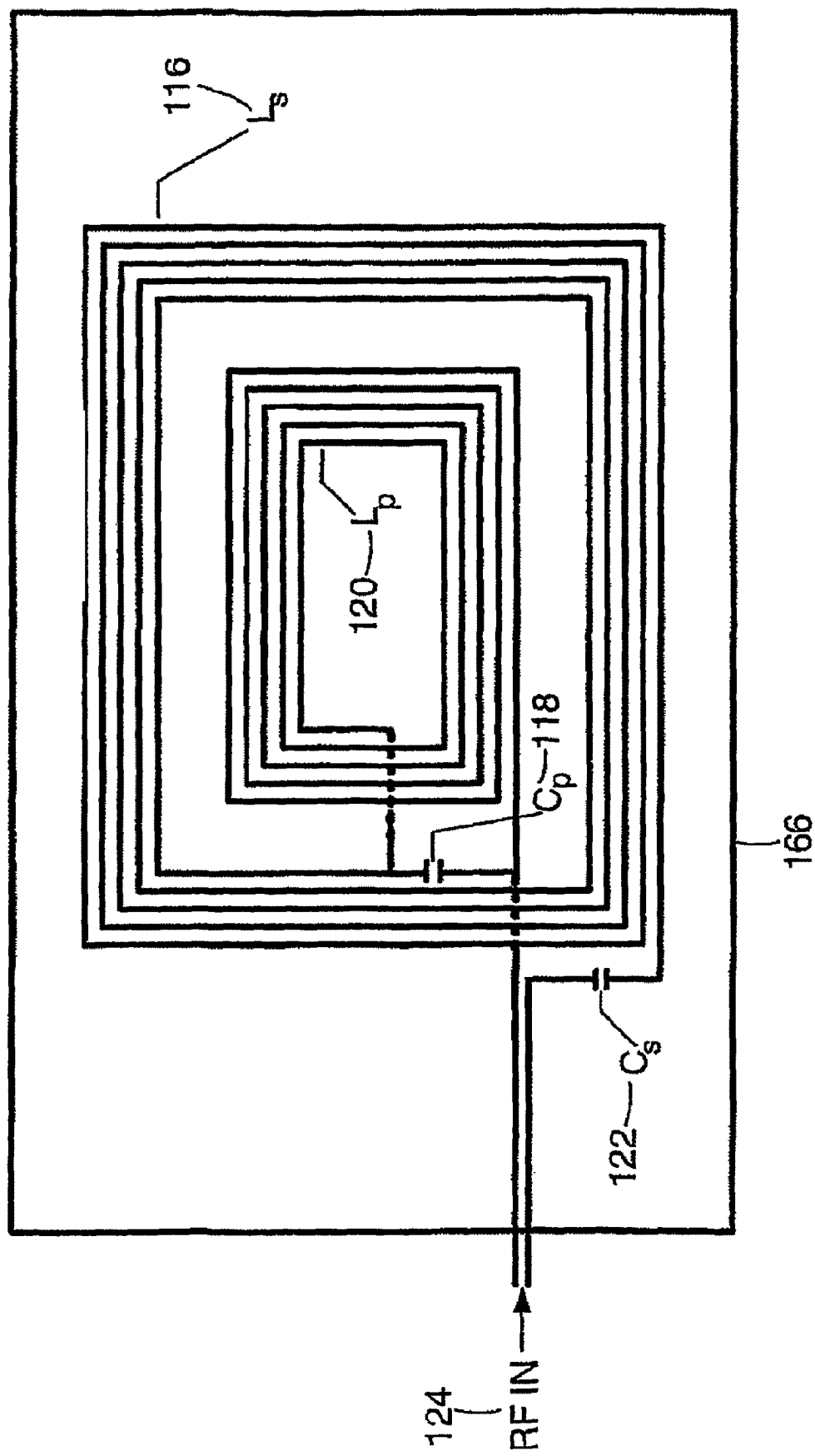
FIG. 24 is a diagram illustrating a transmit antenna of the interface of FIG. 23.

FIG. 24 shows an implementation of the transmit antenna 166 which takes the signal to be transmitted (RF IN 124) and launches it across the wireless interface. The antenna 166 comprises a parallel resonant circuit including a first inductor in the form of a parallel coil 120 and a series resonant circuit including a second inductor in the form of a series coil 116. The parallel capacitor 118 is used to tune the parallel resonance circuit while capacitor 122 is used to tune the series resonance circuit. By using the two transmitting coils, the amount of power transmitted from the antenna is increased significantly.

The tuning of the transmit antenna 166 in FIG. 24 is dependent on the modulation scheme used as well as the signal data rate. Amplitude Shift Keying (ASK), Frequency Shift Keying (FSK), Phase Shift Keying (PSK) or, indeed, any higher order modulation scheme may be used. In this particular implementation ASIC is used as an example. A suitable data rate for a mobile display may be 6.75 Mb/s. This corresponds to a wave of maximum frequency 3.375 MHz, assuming that non-return to zero (NRZ) data encoding is used. For ASK, the carrier frequency must be suitably higher than the data rate to reduce the complexity of the demodulation. A suitable value of the carrier frequency would be 8× or more the value of the data rate. In this case, 27 MHz is a reasonable choice for the carrier frequency.

Figure 25:
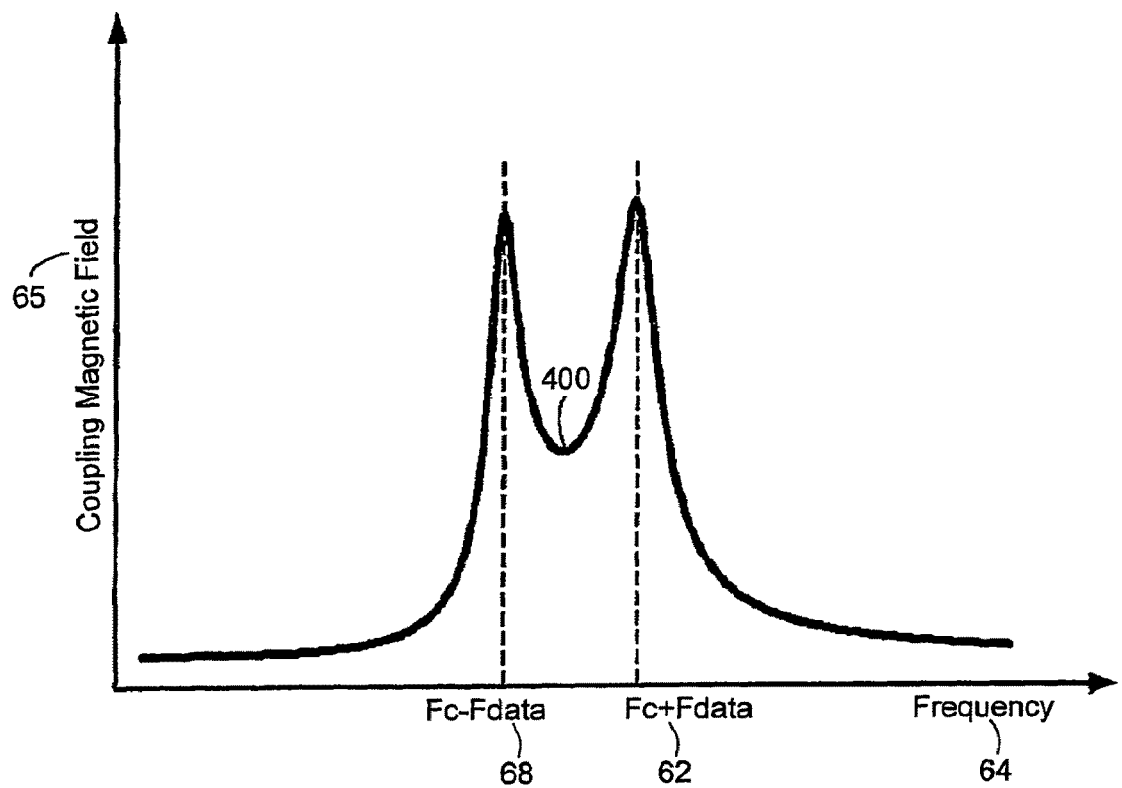
FIG. 25 is a graph of coupling magnetic field against frequency illustrating the performance of the antenna of FIG. 24.

FIG. 25 shows the variation of the coupling magnetic field 65 of the transmit antenna with frequency 64. The response has two peaks at the lower sideband (Fc−Fdata 68) and at the upper sideband (Fc−Fdata 62), where Fc is the frequency of the power carrying signal and Fdata is the frequency of the data carrying signal. For Fc=27 MHz and Fdata=3.375 MHz, the lower and upper sidebands are at:

$$Fc-F\text{data}=23.625 \text{ MHz} \qquad 1$$

$$Fc+F\text{data}=30.375 \text{ MHz} \qquad 2$$

The antenna resonance peaks are tuned to these values. In this implementation, the series resonance is tuned to 23.625 MHz while the parallel resonance is tuned to 30.375 MHz. The Qs of two resonances are chosen to be sufficiently high so that the overlap at 27 MHz 400 (in FIG. 25) has sufficient power to transmit the carrier. A suitable value for the Q for both resonances is 3 or higher.

Figure 26:
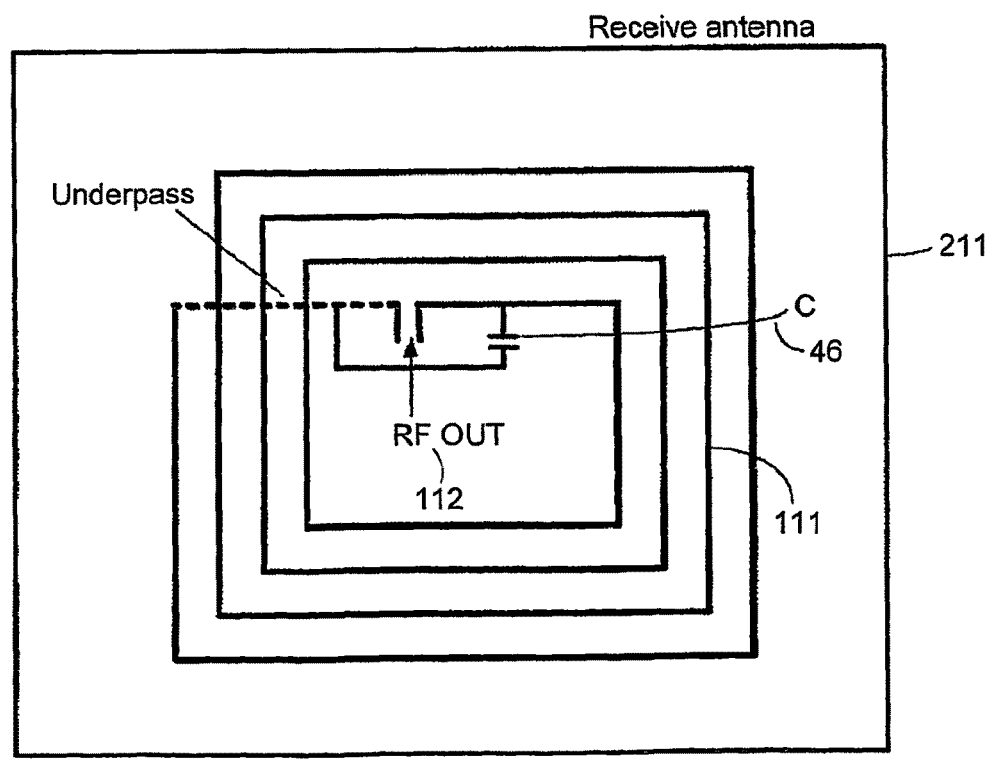
FIG. 26 is a diagram illustrating a receive antenna of the interface of FIG. 23.

FIG. 26 shows an implementation of the receive antenna 211 which is based on a parallel resonance circuit. The antenna 211 comprises a third inductor in the form of an inductive coil 111 and the tuning capacitor 46 and is designed to resonate at a frequency which is a geometric mean of the two sideband frequencies, i.e., $((Fc+F\text{data})(Fc-F\text{data}))^{1/2}$, which is approximately 27 MHz. A suitable Q for the receiver antenna is 3 or higher. The output signal (RF OUT 112) connects the signal to the rest of the receiver system. In use, the third inductor 111 is temporarily or permanently inductively coupled to the first and second inductors 120, 116.

Figure 27:
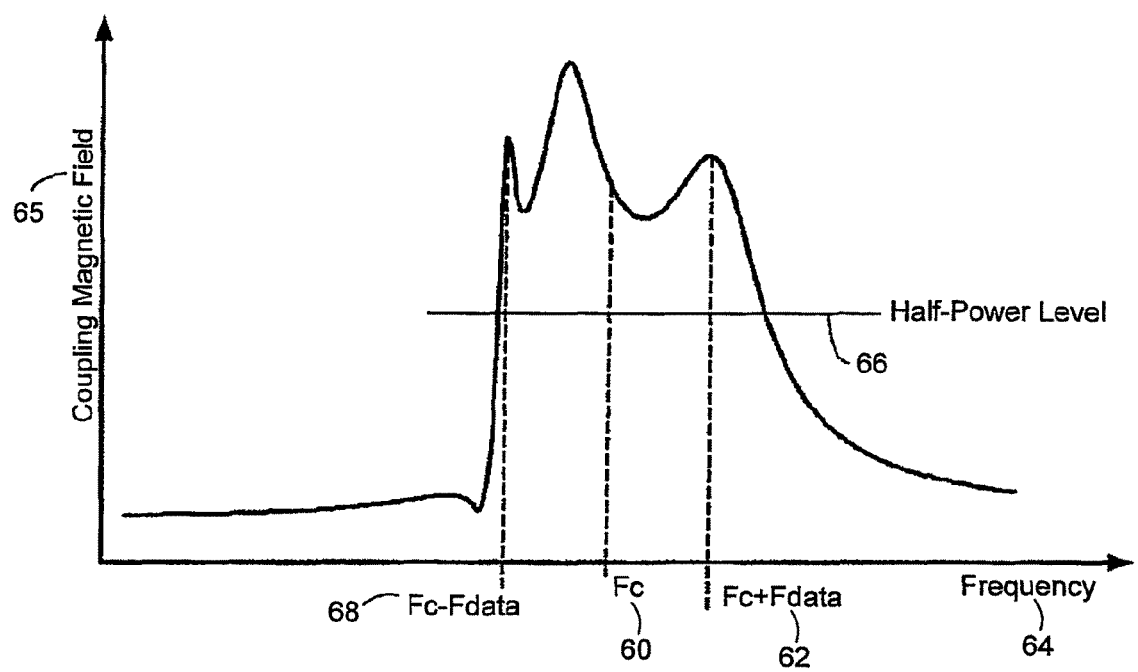
FIG. 27 is a graph of coupling magnetic field against frequency illustrating the coupling performance of the interface of FIG. 23.

FIG. 27 shows the combined response of the transmit antenna 166 and receive antenna 211. It plots the variation of the coupling magnetic field 65 with frequency 64. The response is broadband with a high Q covering the range between the lower sideband (Fc−Fdata 68) and the upper sideband (Fc+Fdata 62) of the data carrying signal. Furthermore, the half-power level 66 is such that the lower sideband 68 and upper sideband 62 lie inside the response curve. This leads to the antenna response having a very high 'Q' to aid the transmission of power but also a very broadband response to ensure the transmission of high speed data substantially without any distortion.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

The invention claimed is:

1. A wireless interface comprising:
   a receiving section; and
   a transmitting section arranged to supply signals and power exclusively wirelessly to the receiving section, the transmitting section including a transmitter arranged to modulate a carrier with the signals and connected to a transmit antenna, the transmit antenna including a parallel resonant circuit including a first inductor and a series resonant circuit including a second inductor, the receiving section including a receive antenna including at least one third inductor arranged to be inductively coupled to the first and second inductors.

2. The wireless interface as claimed in claim 1, comprising a display.

3. The wireless interface as claimed in claim 2, in which the receiving section includes an image display device.

4. The wireless interface as claimed in claim 3, in which the device is a liquid crystal device.

5. The wireless interface as claimed in claim 3, in which the receiving section includes a display backlight.

6. The wireless interface as claimed in claim 1, comprising a radio frequency identification system.

7. The wireless interface as claimed in claim 1, in which the first and second inductors are arranged to be permanently inductively coupled to the at least one third inductor.

8. The wireless interface as claimed in claim 1, in which the first and second inductors are arranged to be temporarily inductively coupled to the at least one third inductor.

9. The wireless interface as claimed in claim 1, in which the carrier is a radio frequency carrier.

10. The wireless interface as claimed in claim 1, in which the parallel resonant circuit and the series resonant circuit are connected in series.

11. The wireless interface as claimed in claim 1, in which the first and second inductors are planar inductors.

12. The wireless interface as claimed in claim 11, in which the first and second inductors are coplanar.

13. The wireless interface as claimed in claim 12, in which one of the first and second inductors is disposed inside the other of the first and second inductors and coaxial therewith.

14. The wireless interface as claimed in claim 13, in which the at least one third inductor is arranged to be coaxial with the first and second inductors.

15. The wireless interface as claimed in claim 1, in which the at least one third inductor is a planar inductor.

16. The wireless interface as claimed in claim 1, in which the parallel and series resonant circuits are tuned to different frequencies.

17. The wireless interface as claimed in claim 16, in which the parallel and series resonant circuits are tuned substantially to respective sideband frequencies of the modulated carrier.

18. The wireless interface as claimed in claim 1, in which the parallel and series resonant circuits have resonant frequencies and Q's such that the carrier and the sidebands of the modulated carrier are within the half power bandwidth of the transmit antenna.

19. The wireless interface as claimed in claim 1, in which the receive antenna comprises a further resonant circuit including the at least one third inductor.

20. The wireless interface as claimed in claim 19, in which the further resonant circuit is a parallel resonant circuit.

21. The wireless interface as claimed in claim 19, in which the further resonant circuit is tuned to a frequency between the sidebands of the modulated carrier.

22. The wireless interface as claimed in claim 21, in which the further resonant circuit is tuned to the geometric mean of the sideband frequencies.

23. The wireless interface as claimed in claim 19, in which the further resonant circuit has a resonant frequency and a Q such that the carrier and the sidebands of the modulated carrier are within the half power bandwidth of the receiver antenna.

24. The wireless interface as claimed in claim 1, in which the transmit and receive antennae are arranged such that the carrier and sidebands of the modulated carrier are within the half power bandwidth of the inductive coupling.

25. The wireless interface as claimed in claim 1, in which the transmitter is arranged to perform one of amplitude modulation, frequency modulation and phase modulation.

26. The wireless interface as claimed in claim 1, in which the receiving section comprises a demodulator for demodulating signals received by the receive antenna.

27. The wireless interface as claimed in claim 1, in which the receiving section comprises a power supply arrangement arranged to power the whole of the receiving section exclusively from power received by the receive antenna.

28. A transmitting section for a wireless interface for supplying signals and power exclusively wirelessly to a receiving section of the interface, comprising:
 a transmitter arranged to modulate a carrier with the signals and connected to a transmit antenna including a parallel resonant circuit including a first inductor and a series resonant circuit including a second inductor.

* * * * *